US011198081B2

(12) United States Patent
Brown et al.

(10) Patent No.: US 11,198,081 B2
(45) Date of Patent: Dec. 14, 2021

(54) FILTER RACK FOR BLOWER COIL UNITS

(71) Applicant: International Environmental Corporation, Oklahoma City, OK (US)

(72) Inventors: James W. Brown, Edmond, OK (US); Phillip Knowles, Oklahoma City, OK (US)

(73) Assignee: International Environmental Corporation, Oklahoma City, OK (US)

( * ) Notice: Subject to any disclaimer, the term of this patent is extended or adjusted under 35 U.S.C. 154(b) by 263 days.

(21) Appl. No.: 16/233,919

(22) Filed: Dec. 27, 2018

(65) Prior Publication Data

US 2020/0101408 A1 Apr. 2, 2020

Related U.S. Application Data

(60) Provisional application No. 62/738,840, filed on Sep. 28, 2018.

(51) Int. Cl.
*B01D 46/00* (2006.01)
*B01D 46/10* (2006.01)
*F24F 1/0073* (2019.01)

(52) U.S. Cl.
CPC ......... *B01D 46/0005* (2013.01); *B01D 46/10* (2013.01); *F24F 1/0073* (2019.02);
(Continued)

(58) Field of Classification Search
None
See application file for complete search history.

(56) References Cited

U.S. PATENT DOCUMENTS 3,494,113 A * 2/1970 Kinney ................ B01D 46/10
    55/481
3,712,033 A * 1/1973 Gronholz ............ B01D 46/521
    55/493
(Continued)

FOREIGN PATENT DOCUMENTS

KR    2012005096    5/2012

OTHER PUBLICATIONS

International Search Report and Written Opinion of The International Search Authority dated Mar. 6, 2019 in International Application No. PCT/US2018/067694 (8 pages).

*Primary Examiner* — Bobby Ramdhanie
*Assistant Examiner* — Brit E. Anbacht
(74) *Attorney, Agent, or Firm* — Neal, Gerber & Eisenberg LLP; Thomas E. Williams

(57) ABSTRACT

Method and apparatus are disclosed for filter racks for blower coil units. An example filter rack for a blower coil unit includes a frame. The frame includes a rear frame structure, a front frame structure coupled to and spaced apart from the rear frame structure to define a slot that is configured to house a filter for filtering air flowing from a blow coil unit, and a side extending between the front frame structure and the rear frame structure. The side defines a first opening to the slot to enable the filter to be inserted into and removed from the slot. The example filter rack also includes a magnet fixed along the side and a panel configured to couple to the side via the magnet. The panel securely encloses the filter within the slot when coupled to the side and provides access to the slot when decoupled from the side.

24 Claims, 18 Drawing Sheets

(52) U.S. Cl.
CPC .... *B01D 2265/024* (2013.01); *B01D 2265/06* (2013.01); *B01D 2279/50* (2013.01)

(56) References Cited

U.S. PATENT DOCUMENTS

| | | | | |
|---|---|---|---|---|
| 3,778,985 | A * | 12/1973 | Daigle | B01D 46/10 55/493 |
| 3,970,558 | A * | 7/1976 | Lee | A47J 37/1223 210/138 |
| 4,885,015 | A * | 12/1989 | Goulet | B01D 46/0001 55/497 |
| 5,273,564 | A * | 12/1993 | Hill | B01D 46/0005 55/493 |
| 5,655,825 | A * | 8/1997 | Anoszko | B01D 46/0002 312/262 |
| 6,264,713 | B1 * | 7/2001 | Lewis, II | B01D 46/0005 55/481 |
| 6,849,107 | B1 * | 2/2005 | Huffman | B01D 46/0005 250/436 |
| 7,677,183 | B2 * | 3/2010 | Borggaard | B65D 19/0014 108/51.11 |
| 8,404,023 | B1 * | 3/2013 | Osborne | B01D 53/0407 95/90 |
| 9,127,856 | B2 * | 9/2015 | Cole | B01D 46/4227 |
| 10,092,870 | B2 * | 10/2018 | Sweet | B01D 46/0019 |
| 10,279,920 | B1 * | 5/2019 | Farrell | B01D 39/10 |
| 10,808,950 | B2 * | 10/2020 | Nanjappa | F24F 8/10 |
| 10,940,417 | B1 * | 3/2021 | Bishop | B01D 46/10 |
| 10,994,235 | B2 * | 5/2021 | Zhang | B01D 46/008 |
| 2002/0121196 | A1 * | 9/2002 | Thakur | B01D 46/10 96/224 |
| 2002/0194824 | A1 * | 12/2002 | Clayton | B01D 46/0005 55/482 |
| 2004/0172927 | A1 * | 9/2004 | Lee | B01D 46/0005 55/495 |
| 2006/0042207 | A1 * | 3/2006 | Jenkins | B01D 46/0005 55/490.1 |
| 2008/0314248 | A1 * | 12/2008 | Peteln | B01D 53/18 96/1 |
| 2009/0199526 | A1 | 8/2009 | Wallace | |
| 2010/0037574 | A1 * | 2/2010 | Weber | F24F 13/28 55/496 |
| 2010/0101197 | A1 * | 4/2010 | Livingstone | B01D 46/0006 55/356 |
| 2010/0251678 | A1 | 10/2010 | Mann et al. | |
| 2013/0232931 | A1 * | 9/2013 | Malcolm | B01D 46/521 55/481 |
| 2014/0230385 | A1 * | 8/2014 | Schuld | B01D 46/521 55/481 |
| 2016/0339375 | A1 * | 11/2016 | Sweet | B01D 46/02 |
| 2017/0144093 | A1 * | 5/2017 | Neri | B01D 46/4227 |
| 2019/0145655 | A1 * | 5/2019 | Conrad | B01D 46/0005 165/119 |
| 2019/0160408 | A1 * | 5/2019 | Huang | B01D 46/10 |

* cited by examiner

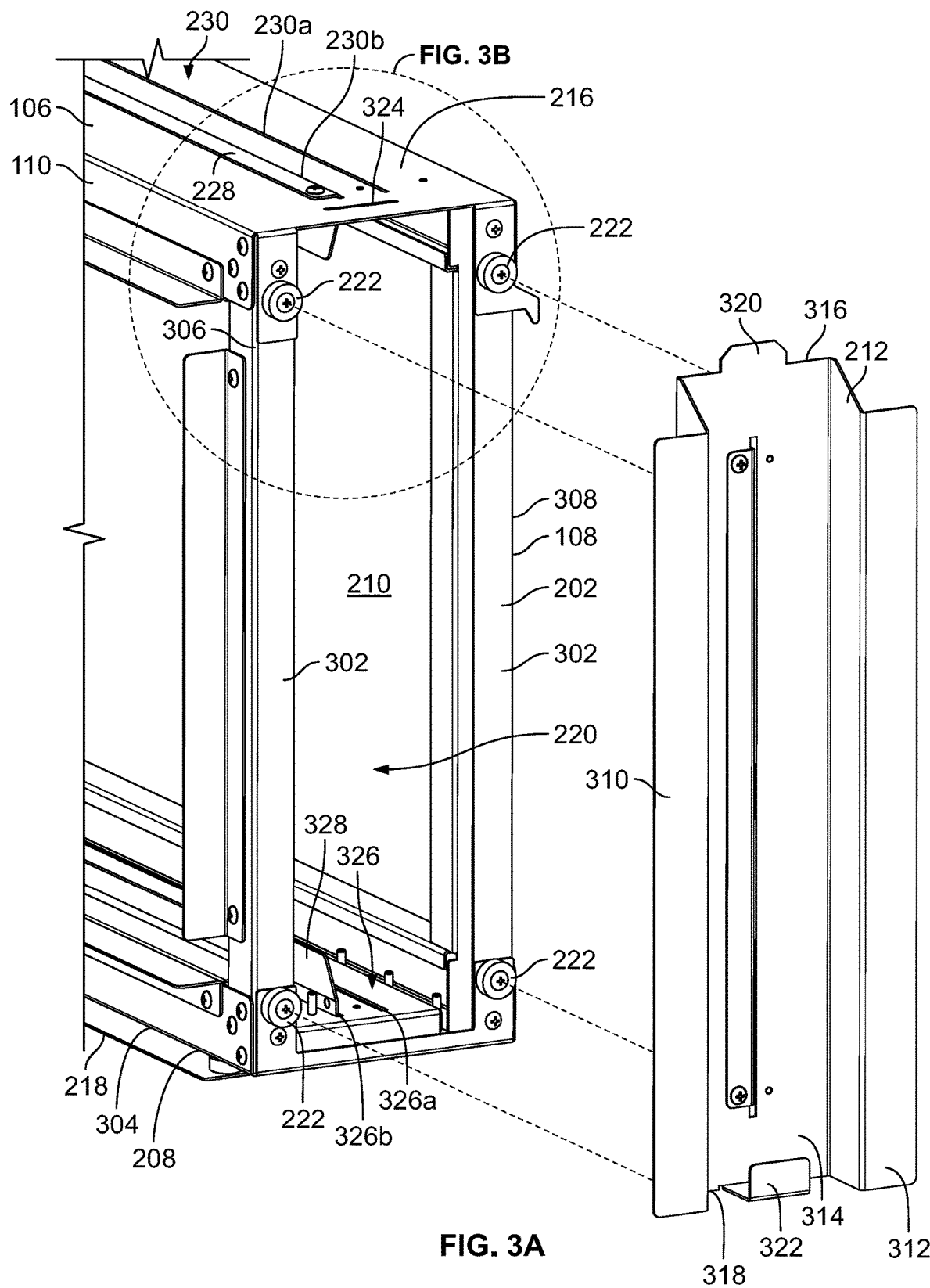

FILTER RACK FOR BLOWER COIL UNITS

CROSS-REFERENCE TO RELATED APPLICATIONS

This application claims the benefit of U.S. Provisional Patent Application No. 62/738,840, filed on Sep. 28, 2018, which is hereby incorporated by reference in its entirety.

TECHNICAL FIELD

The present disclosure generally relates to filter racks and, more specifically, to filter racks for blower coil units.

BACKGROUND

Oftentimes, buildings include blower coil units to facilitate control of an air temperature within the building. For instance, blower coil units may be incorporated into heating, ventilation, and air conditioning (HVAC) systems of industrial, commercial, and/or residential buildings.

A blower coil unit may be positioned at a location within a building that is out of the way from occupants within a building. For instance, the blower coil unit may be positioned away from heavy foot-traffic areas to prevent a person from damaging, changing settings of, and/or otherwise affecting performance of the blower coil unit. In some instances, a blower coil unit may be wall-mounted, ceiling mounted, and/or concealed within a cavity of a wall and/or ceiling to position the blower coil unit away from occupants within a building. In turn, it potentially may be difficult to service/maintain a blower coil unit located in such a position, for instance, to replace a filter of the blower coil unit.

Blower coil units typically include a blower and a coil to heat or cool an area without ductwork. In some instances, the coil receives fluid (e.g., water) from a fluid source to affect a temperature of air via heat transfer. For instance, the coil receives cool fluid to cool the temperature of nearby air or receives warm fluid to warm the temperature of nearby air. Further, the blower blows air from the coil to disseminate the warmed or cooled air to affect the air temperature of at least a portion of the building in which the blower coil unit is located.

All blower coil units include a filter to prevent material (e.g., dust, pollen, particulates, etc.) from entering the spaces they serve. For instance, a blower coil unit may include a filter to protect a server room from a number of types of particulates, etc.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for filter racks for blower coil units. An example disclosed filter rack for a blower coil unit includes a frame. The frame includes a rear frame structure configured to couple to the blower coil unit, a front frame structure coupled to and spaced apart from the rear frame structure to define a slot that is configured to house a filter for filtering air flowing from the blow coil unit, and a first side extending between the front frame structure and the rear frame structure. The first side defines a first opening to the slot to enable the filter to be inserted into and removed from the slot. The example disclosed filter rack also includes a first magnet fixed along the first side and a first side panel configured to couple to the first side via the first magnet. The first side panel securely encloses the filter within the slot when coupled to the first side and provides access to the slot when decoupled from the first side.

Some examples further include a second side of the frame that extends between the front frame structure and the rear frame structure opposite the first side. The second side defines a second opening to the slot to further enable the filter to be inserted into and removed from the slot. Such examples further include a second magnet fixed along the second side and a second side panel configured to couple to the second side via the second magnet. The second side panel securely encloses the filter within the slot when coupled to the second side and provides access to the slot via the second opening when decoupled from the second side.

In some examples, the first side panel includes a first flange configured to couple to the first side along a front edge, a second flange configured to couple to the first side along a rear edge, and a recessed portion between the first flange and the second flange that is configured to extend into the first opening when the first side panel is coupled to the first side.

In some examples, the frame includes an end panel extending between the front frame structure and the rear frame structure. The end panel defines a slit adjacent to the first side. In some such examples, the first side panel includes a first edge, a second edge opposite the first edge, a tab extending from the first edge that is configured to be inserted into the slit to securely couple the first side panel to the first side, and a handle extending from the second edge that facilitates a user in grasping the first side panel while coupling or decoupling the first side panel to or from the first side.

Some examples further include a plurality of magnets that includes the first magnet and is positioned along edges of the first side.

Some examples further include filter guides extending between the first side and a second side opposite the first side to guide the filter as the filter is being inserted into or removed from the slot via the first opening. In some such examples, the filter guides are adjustable to enable filters of different sizes to be securely housed within the slot. Further, some such examples further include end panels that extend between the front frame structure and the rear frame structure and between the first side and the second side. Each of the end panels defines slits extending between the first side and the second side. Each of the filter guides is inserted into one of the slits to adjustably position the filter guides.

In some examples, the frame includes an end that extends between the front frame structure and the rear frame structure. The end defines a third opening to the slot that enables the filter to be inserted into and removed from the slot. Some such examples further include a third magnet fixed along the end of the frame and a rotatable panel that is hingedly coupled to the end and configured to couple to the third magnet. The rotatable panel is coupled to the third magnet in a closed position to securely enclose the filter within the slot. The rotatable panel is decoupled from the third magnet in an open position to provide access to the slot via the third opening. Some such examples further include a filter guide coupled to the first side to guide the filter as the filter is inserted into or removed from the slot via the third opening.

An example disclosed filter rack for a blower coil unit includes a frame. The frame includes a rear frame structure configured to couple to the blower coil unit, a front frame structure coupled to and spaced apart from the rear frame structure to define a slot that is configured to house a filter for filtering air flowing from the blow coil unit, and an end extending between the front frame structure and the rear frame structure. The end defines a first opening to the slot to enable the filter to be inserted into and removed from the slot. The example disclosed filter rack also includes a first magnet fixed along the end and a rotatable panel hingedly coupled to the end and configured to couple to the first magnet. The rotatable panel is coupled to the first magnet in a closed position to securely enclose the filter within the slot. The rotatable panel is decoupled from the first magnet in an open position to provide access to the slot.

In some examples, the rear frame structure is configured to couple to the blower coil unit such that the end is a top end and the rotatable panel rotates upwardly to the open position. In some such examples, the rear frame structure is configured to couple to the blower coil unit such that the end is a bottom end and the rotatable panel rotates downwardly to the open position.

Some examples further include a hinge that hingedly couples the rotatable panel to the end.

In some examples, the rotatable panel includes a first side hingedly coupled to the end, a second side configured to couple to first magnet, and a middle portion extending between the first side and the second side that is configured to cover the first opening when the rotatable panel is in the closed position. In some such examples, the second side includes a flange that is configured to extend beyond the frame when the rotatable panel is in the closed position to facilitate a user in grasping the rotatable panel while transitioning the rotatable panel between the closed position and the open position.

Some examples further include a plurality of magnets that includes the first magnet and is positioned along an edge of the end.

Some examples further include opposing side panels coupled to the frame and filter guides extending along the side panels that guide the filter as the filter is inserted into or removed from the slot via the first opening.

Some examples further include a first side of the frame that extends between the front frame structure and the rear frame structure. The first side defines a first side opening to the slot to further enable the filter to be inserted into and removed from the slot. Such examples also include a first side magnet fixed along the first side and a first side panel configured to couple to the first side via the first side magnet. The first side panel securely encloses the filter within the slot when coupled to the first side and provides access to the slot via the first side opening when decoupled from the first side. Some such examples further include a second side of the frame that extends between the front frame structure and the rear frame structure opposite the first side. The second side defines a second side opening to the slot to further enable the filter to be inserted into and removed from the slot. Such examples also include a second side magnet fixed along the second side and a second side panel configured to couple to the second side via the second side magnet. The second side panel securely encloses the filter within the slot when coupled to the second side and provides access to the slot via the second side opening when decoupled from the second side. Further, some such examples further include a filter guide coupled to the rotatable panel to guide the filter as the filter is inserted into or removed from the slot via the first side opening or the second side opening.

An example disclosed filter rack for a blower coil unit includes a frame. The frame includes a rear frame structure configured to couple to the blower coil unit, a front frame structure coupled to and spaced apart from the rear frame structure, and a mullion coupled to the front frame structure and the rear frame structure. The front frame structure and the rear frame structure define a first slot and a second slot that are separated from each by the mullion and are configured to house filters for filtering air flowing from the blower coil unit. The frame also includes sides defining openings to the first slot and the second slot to enable the filters to be inserted into and removed from the first slot and the second slot. The example disclosed filter rack also includes magnets fixed along the sides adjacent to the openings and panels configured to couple to the sides via the magnets. The panels securely enclose the filters within the first slot and the second slot when coupled to the magnets and provide access to the first slot and the second slot when decoupled from the magnets.

In some examples, the sides include a first side that defines a first side opening to the first slot and a second side that defines a second side opening to the second slot. The panels include a first side panel that is configured to couple to the first side to cover the first opening and a second side panel that is configured to couple to the second side to cover the second opening.

In some examples, one of the sides includes an end panel that defines a first opening to the first slot and a second opening to the second slot. The panels include a first rotatable panel that is rotatably coupled to the end and configured to cover the first opening. The panels include a second rotatable panel that is rotatably coupled to the end and configured to cover the second opening.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 3A further depicts one of the side panels and a portion of the frame of FIG. 2.

DETAILED DESCRIPTION

Figure 1:
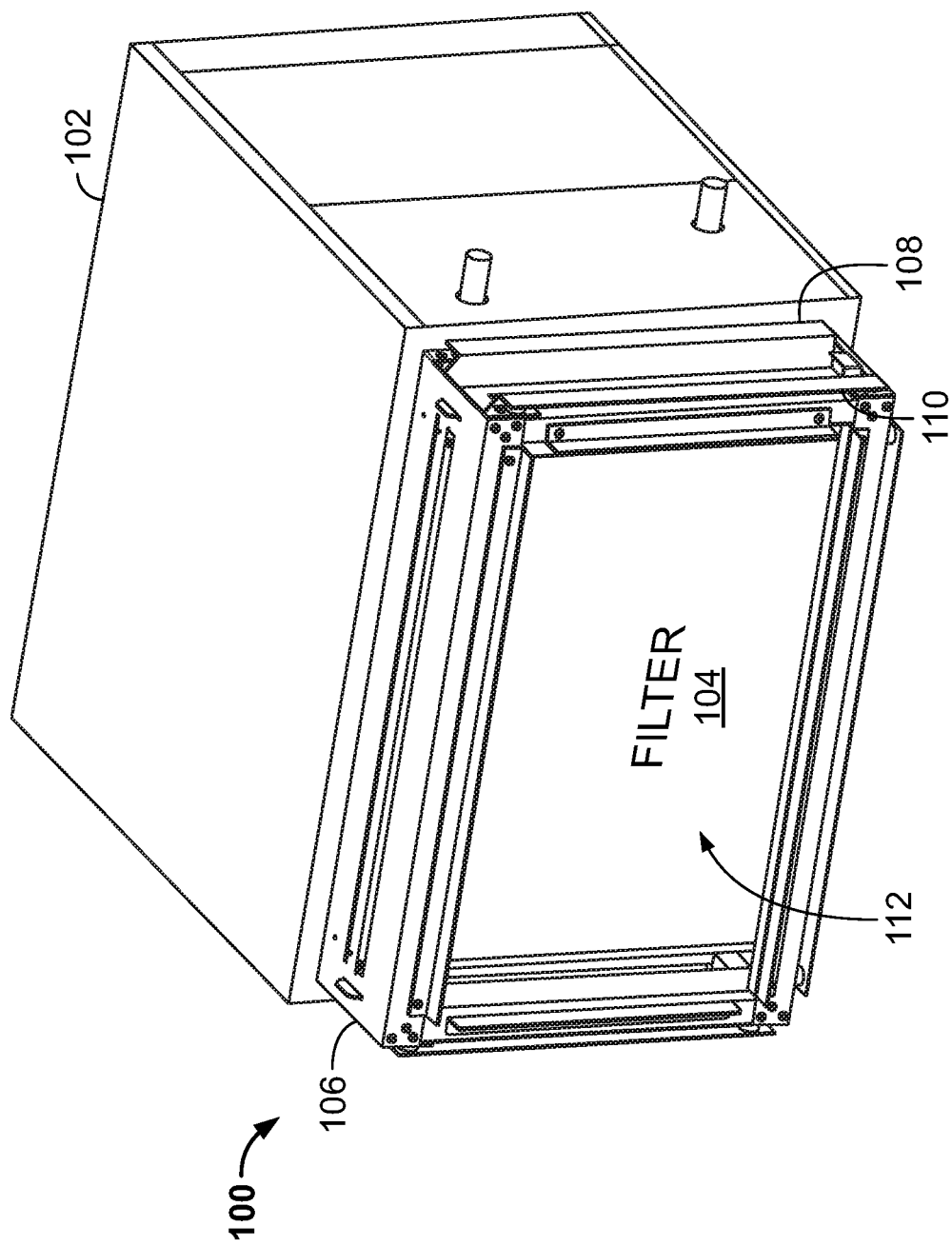
FIG. 1 illustrates an example filter rack and a filter for a blower coil unit in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example apparatus disclosed herein include various filter rack embodiments for housing one or more filters of a blower coil unit. The filter rack embodiments disclosed herein facilitate a technician in quickly and easily inserting, removing, and/or replacing filter(s) of a blower coil unit (e.g., when positioned in a difficult-to-reach, dimly lit location). For example, a filter rack disclosed herein includes a frame that defines a slot configured to house one or more filters for a blow coil unit. Further, the filter rack includes one or more walls (e.g., sides, an upper wall, a lower wall) that define respective one or more openings to the slot. The opening(s) enable the filter to be inserted into and removed from the slot. Additionally, the filter rack includes one or more magnets fixed along the wall(s) and one or more panels (e.g., side panels, a rotatable panel) configured to couple to and/or decouple from the wall(s) via the magnet(s). For example, each of the panel(s) is configured to (1) securely enclose one or more filters positioned within the slot when coupled to a corresponding wall via magnet(s) and (2) provide access to the slot when decoupled from the corresponding wall via magnet(s). That is, the example filter racks disclosed herein include magnetic panel(s) and wall(s) to enable a technician to quickly and easily access and/or cover a filter slot for installation of filter(s) of a blower coil unit.

Turning to the figures, FIG. 1 illustrates an example filter rack 100 in accordance with the teachings herein. In the illustrated example, the filter rack 100 is coupled to a blower coil unit 102 and houses a filter 104 for the blower coil unit 102. The filter rack 100 includes a frame 106 that includes a rear frame structure 108 and a front frame structure 110. The front frame structure 110 and the rear frame structure 108 are spaced apart from and coupled to each other to at least partially define a slot (e.g., a slot 210 of FIG. 2) in which the filter 104 is housed by the filter rack 100. Further, the rear frame structure 108 and the front frame structure 110 define an air passageway 112. When the filter 104 is housed by the filter rack 100, the filter 104 is positioned within a portion of the air passageway 112. In turn, when the filter rack 100 is coupled to the blower coil unit 102, the filter 104 housed within the filter rack 100 filters air that is blown through the air passageway 112 from and/or to the blower coil unit 102.

Figure 2:
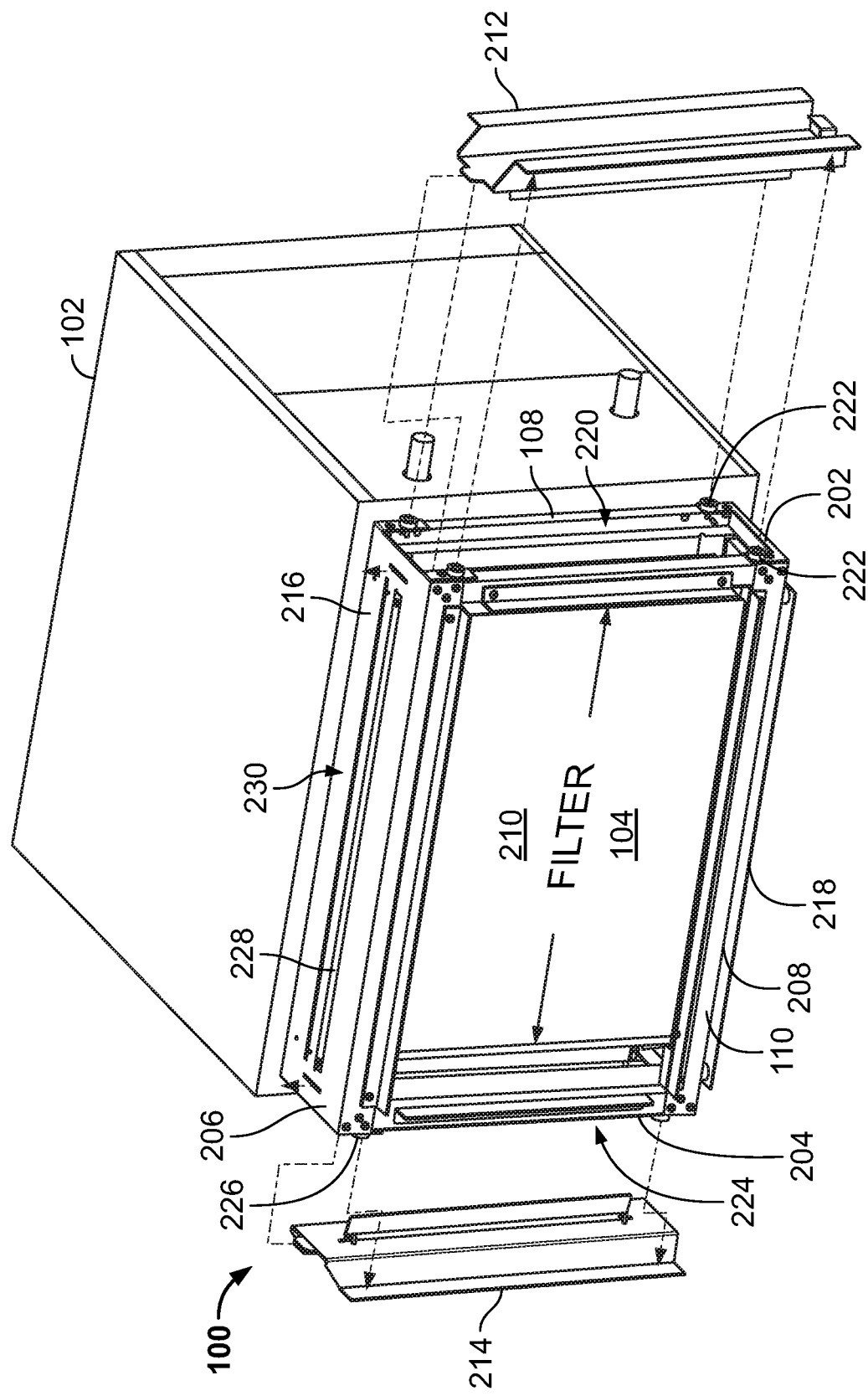
FIG. 2 depicts side panels and a frame of the filter rack of FIG. 1 when the side panels are decoupled from the frame.

FIG. 2 further depicts the filter rack 100 housing the filter 104 and coupled to the blower coil unit 102. As illustrated in FIG. 2, the frame 106 of the filter rack 100 includes the rear frame structure 108 and the front frame structure 110. The frame 106 also includes a side 202 (sometimes referred to as a first side), a side 204 (sometimes referred to as a second side) opposite the side 202, an end 206 (sometimes referred to as a side), and an end 208 (sometimes referred to as a side) opposite the end 206 that each extend between the rear frame structure 108 and the front frame structure 110. Further, the side 202 and the side 204 extend between the end 206 and the end 208, and the end 206 and the end 208 extend between the side 202 and the side 204. Further, the rear frame structure 108, the front frame structure 110, the side 202, the side 204, the end 206, and the end 208 of the frame 106 define a slot 210 in which the filter 104 is housed. The filter rack 100 of the illustrated example also includes a side panel 212 (sometimes referred to as a first side panel), a side panel 214 (sometimes referred to as a second side panel), an end panel 216, and a rotatable panel 218 (sometimes referred to as an end panel). As disclosed in further detail below, the side panel 212 is configured to detachably couple to the side 202, the side panel 214 is configured to detachably couple to the side 204, the end panel 216 forms the end 206, and the rotatable panel 218 is rotatably coupled to the end 208.

As illustrated in FIG. 2, the side 202 of the frame 106 defines an opening 220 (sometimes referred to as a first opening or a first side opening) to the slot 210. When the side panel 212 is removed from the frame 106, the opening 220 provides access to the slot 210 to enable a technician to remove the filter 104 from, insert the filter 104 into, and/or otherwise access the filter 104 within the slot 210 of the filter rack 100. Further, the filter rack 100 includes one or more magnets 222 (sometimes referred to as first magnets, side magnets, or first side magnets) that are fixed along the side 202 of the frame 106 to enable the side panel 212 to couple to and/or decouple from the side 202 of the frame 106. For example, the side panel 212 includes magnetic material to enable the side panel 212 to magnetically couple to the magnets 222 (e.g., including a first magnet or first side magnet) located along the side 202 of the frame 106. Additionally or alternatively, one or more magnets are fixed (e.g., via fastener(s), adhesive, welding, etc.) to the side panel 212 and are configured to magnetically couple the side panel 212 to the magnets 222.

Similarly, in the illustrated example, the side 204 of the frame 106 defines an opening 224 (sometimes referred to as a second opening or a second side opening) to the slot 210. The opening 224 provides access to the slot 210 to enable a technician to remove the filter 104 from, insert the filter 104 into, and/or otherwise access the filter 104 within the slot 210 of the filter rack 100. The filter rack 100 also includes one or more magnets 226 (sometimes referred to as second magnets, side magnets, or second side magnets) that are fixed along the side 204 of the frame 106 to enable the side panel 214 to couple to and/or decouple from the side 204 of the frame 106. For example, the side panel 214 includes magnetic material to enable the side panel 214 to magnetically couple to the magnets 226 (e.g., including a second magnet or second side magnet) located along the side 204 of the frame 106. Additionally or alternatively, one or more magnets are fixed to the side panel 214 and are configured to magnetically couple the side panel 214 to the magnets 226.

Further, the filter rack 100 of the illustrated example includes a filter guide 228 (sometimes referred to as a stopper) that is configured to guide the filter 104 into and/or out of the slot 210 as the filter 104 is inserted into and/or removed from the slot 210 via the opening 220 and/or the opening 224. For example, the filter guide 228 extends along the end panel 216 of the frame 106 between the side 202 and the side 204 to guide the filter 104 through the opening 220 and/or the opening 224. Further, the filter guide 228 securely positions the filter 104 within the slot 210 of the filter rack 100. For example, the filter guide 228 secures the filter 104 against the rear frame structure 108 and/or the front frame structure 110 when housed within the slot 210. In the illustrated example, the filter guide 228 is adjustable to enable filters of different sizes (e.g., about a 1-inch thickness, a 2-inch thickness, a 4-inch thickness, etc.) to be inserted into and securely housed within the slot 210. For example, the end panel 216 defines a plurality of slits 230 that extend between the side 202 and the side 204 of the frame 106. To position the filter guide 228 relative to the slot 210, the filter guide 228 partially extends through one of the slits 230 and is coupled to the end panel 216 (e.g., via one or more fasteners).

As disclosed below in further detail, the side panel 212 couples to the side 202 via the magnets 222 and the side panel 214 couples to the side 204 via the magnets 226 to securely enclose the filter 104 within the slot 210 of the filter rack 100. Further, the side panel 212 decouple from the side 202 and/or the side panel 214 decouple from the side 204 to provide access to the slot 210 and/or the filter 104 positioned within the slot 210. The magnets 222 and/or the magnets 226 of the filter rack 100 enable a technician to easily and quickly access and enclose the slot 210 of the filter rack 100, for example, when the blower coil unit 102 is positioned in a location that is difficult to reach. For example, to replace a dirty filter with a clean filter, the technician initially decouples the side panel 212 from the magnets 222 to access the slot 210 via the opening 220 and/or decouples the side panel 214 from the magnets 226 to access the slot 210 via the opening 224. Subsequently, the technician removes the dirty filter through the opening 220 and/or the opening 224 and inserts the clean filter into the slot 210 of the filter rack 100 via the opening 220 and/or the opening 224. After the clean filter is positioned within the slot 210, the technician recouples the side panel 212 to the magnets 222 and/or recouples the side panel 214 to the magnets 226 to securely enclose the clean filter within the slot 210 of the filter rack 100.

FIG. 3A further depicts the side panel 212 and the side 202 of the frame 106. In the illustrated example, the frame 106 includes posts 302, the end panel 216, an end panel 304 that forms the end 208, and the rotatable panel 218. For example, the posts 302 couple to the end panel 216 and the end panel 304 to form the side 202 of the frame 106. Additionally, the frame 106 includes other posts (substantially similar and/or identical to the posts 302) at the side 204 that is opposite to the side 202. The other posts couple to the end panel 216 and the end panel 304 to form the side 204 of the frame 106. Further, the rear frame structure 108 of the illustrated example is formed by the end panel 216 and the end panel 304 coupling to one of the posts 302 located along the side 202 and one of the posts located along the side 204. Similarly, the front frame structure 110 is formed by the end panel 216 and the end panel 304 coupling to another of the posts 302 located along the side 202 and another of the posts located along the side 204. In the illustrated example, the posts 302 along the side 202, the posts along the side 204, the end panel 216, and the end panel 304 are coupled together via fasteners and/or other means. In other examples, a combination of the posts 302 along the side 202, the posts along the side 204, the end panel 216, and/or the end panel 304 are integrally formed together.

As illustrated in FIG. 3A, the magnets 222 are fixed to the side 202 of the frame 106. For example, each of the magnets 222 are coupled to the posts 302, the end panel 216, and/or the end panel 304 that form the side 202 of the frame 106. Further, in the illustrated example, the magnets 222 are positioned along edges of the side 202 such that the magnets 222 do not extend into the opening 220 defined by the side 202. For example, one or more of the magnets 222 are located along a front edge 306 of the side 202 and/or one or more of the magnets 222 are located along a rear edge 308 of the side 202. In the illustrated example, each of the magnets 222 is positioned near a respective corner of the side 202.

Similarly, the magnets 226 are fixed to side 204 of the frame 106. For example, each of the magnets 226 are coupled to the posts of the side 204, the end panel 216, and/or the end panel 304 that form the side 204 of the frame 106. Further, in some examples, the magnets 226 are positioned along edges of the side 202 such that the magnets 222 do not extend into the opening 224 defined by the side 204. For example, each of the magnets 226 is positioned near a respective corner of the side 204.

Returning to FIG. 3A, the side panel 212 of the illustrated example includes a flange 310 (sometimes referred to as a first flange), a flange 312 (sometimes referred to as a second flange) opposite the flange 310, and a recessed portion 314 extending between the flange 310 and the flange 312. The flange 310 is configured to couple to the side 202 along the front edge 306 via one or more of the magnets 222, and the flange 312 is configured to couple to the side 202 along the rear edge 308 via one or more of the magnets 222. Further, the recessed portion 314 is configured to cover the opening 220 of the slot 210 when the side panel 212 is coupled to the side 202 via the magnets 222. For example, when the side panel 212 is coupled to the side 202, the recessed portion 314 extends into the opening 220 to enclose the slot 210.

Further, the side panel 212 of the illustrated example includes an edge 316 (sometimes referred to as a first edge) and an edge 318 (sometimes referred to as a second edge) opposite the edge 316. A tab 320 extends from the edge 316 along the recessed portion 314, and a handle 322 extends from the edge 318 along the recessed portion 314. As illustrated in FIG. 3A, the end panel 216 defines a slit 324 adjacent to the side 202 that corresponds with the tab 320 of the side panel 212. The tab 320 and the slit 324 combine to securely couple the side panel 212 to the side 202 of the frame 106. Further, the handle 322 facilitates a technician in coupling and/or decoupling the side panel 212 to and/or from the side 202. For example, to couple the side panel 212 to the side 202 of the frame 106, the technician is to (1) grasp the handle 322, (2) position the side panel 212 at an angle relative to the side 202 such that the edge 316 is closer to the side 202 than the edge 318 is to the side 202, (3) insert the tab 320 into the slit 324, (4) rotate the edge 318 of the side panel 212 toward the side 202, and (5) magnetically couple the side panel 212 to the magnets 222. To decouple the side panel 212 from the side 202 of the frame 106, the technician is to (1) grasp the handle 322, (2) rotate the edge 318 of the side panel 212 away from the side 202 to decouple the side panel 212 from the magnets 222, (3) remove the tab 320 from the slit 324, and (4) pull the side panel 212 away from the side 202.

As illustrated in FIG. 3A, the end panel 216 defines the slits 230 that extend between the side 202 and the side 204 of the frame 106. The slits 230 include a first slit 230a and a second slit 230b that are parallel to each other. In the illustrated example, the first slit 230a is positioned closer to the rear frame structure 108, and the second slit 230b is positioned centrally between the rear frame structure 108 and the front frame structure 110. Further, in the illustrated example, the rotatable panel 218 defines a plurality of slits 326 that extends between the side 202 and the side 204 of the frame 106. The slits 326 include a first slit 326a and a second slit 326b that are parallel to each other. In the illustrated example, the first slit 326a is positioned closer to the rear frame structure 108, and the second slit 326b is positioned centrally between the rear frame structure 108 and the front frame structure 110. In other examples, the end panel 216 and the rotatable panel 218 may define less (e.g., 0, 1) or more (e.g., 3, 4, etc.) of the slits 230 and the slits 326, respectively, than is illustrated in FIG. 3A.

Additionally, the filter rack 100 of the illustrated example includes the filter guide 228 that is configured to partially extend through one of the slits 230 and couple to the end panel 216 (e.g., via one or more fasteners). Further, the filter rack 100 includes another filter guide 328 (sometimes referred to as a stopper) that is configured to partially extend through one of the slits 326 and couple to the rotatable panel 218 (e.g., via one or more fasteners). The filter guide 228 and the filter guide 328 are configured to guide a filter (e.g., the filter 104) into and/or out of slot 210 via the opening 220 and/or the opening 224. The filter guide 228 and the filter guide 328 also are configured to securely position the filter within the slot 210 of the filter rack 100.

In the illustrated example, the end panel 216 defines a plurality of the slits 230 and the rotatable panel 218 defines a plurality of the slits 326 to enable the filter guide 228 and the filter guide 328, respectively, to be adjustable. For example, the slits 230 are parallel to the slits 326. Further, the filter guide 228 and the filter guide 328 are adjustable to enable filters of different sizes to be inserted into, removed from, and/or securely housed within the slot 210. For example, the filter guide 228 is inserted into the first slit 230a and the filter guide 328 is inserted into the first slit 326a to enable a filter having a first thickness (e.g., about a 1-inch thickness) to be guided into and securely housed within the slot 210. The filter guide 228 is inserted into the second slit 230b and the filter guide 328 is inserted into the second slit 326b to enable a filter having a second thickness (e.g., about a 2-inch thickness) to be guided into and securely housed within the slot 210. Further, the filter guide 228 is removed from the slits 230 and the filter guide 328 is removed from the slits 326 to enable a filter having a third thickness (e.g., about a 4-inch thickness) to be guided into and securely housed within the slot 210. In other examples, the filter guide 228 and the filter guide 328 are fixed to the end panel 216 and the end panel 304, respectively, such that the filter guide 228 and the filter guide 328 are not adjustable.

Figure 3B:
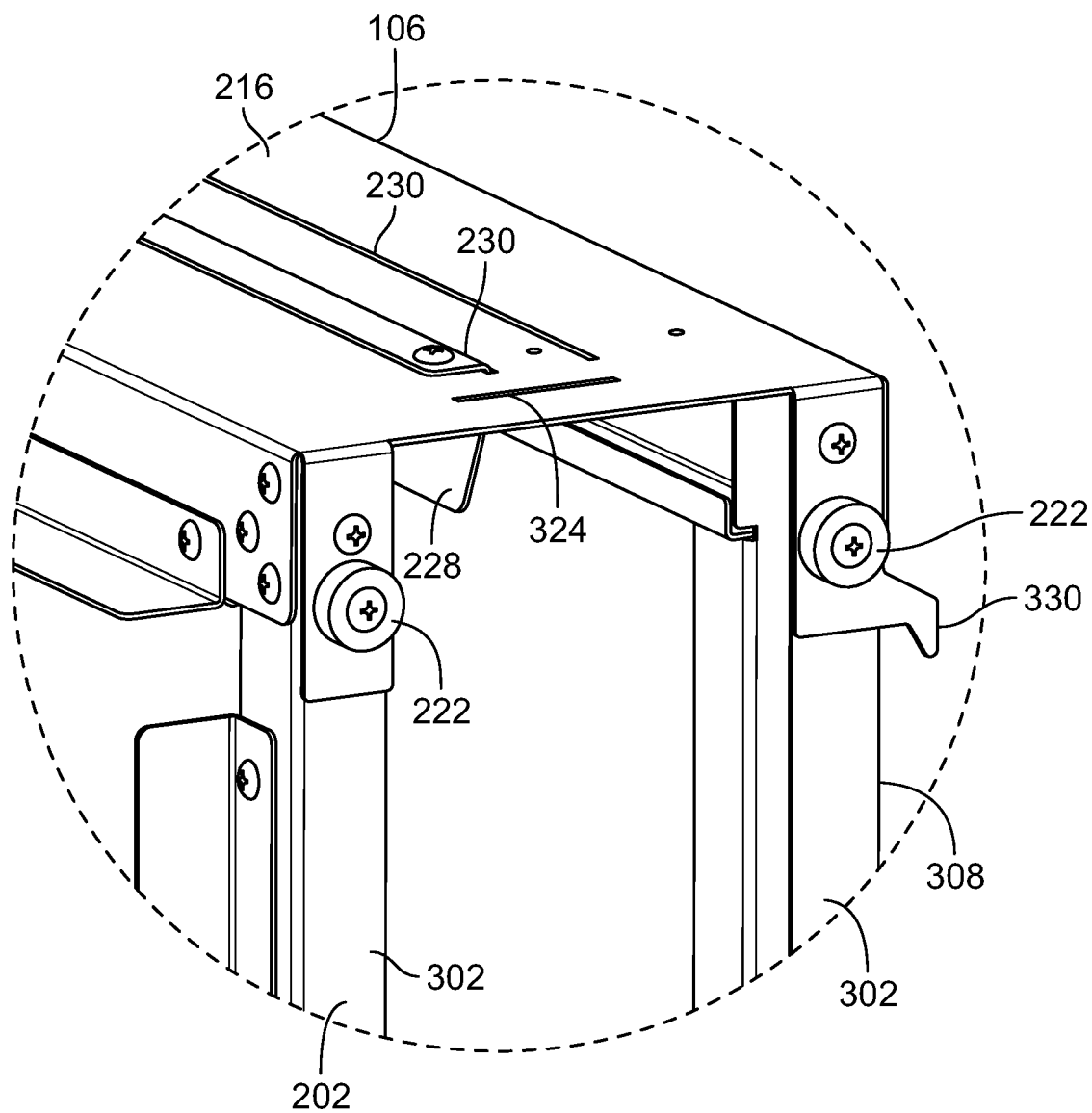
FIG. 3B is a magnified view of a section of the frame identified in FIG. 3A.

FIG. 3B is a magnified view of a section of the frame 106 identified in FIG. 3A. For example, FIG. 3B further depicts a portion of the side 202, the slits 230 and the slit 324 defined by the end panel 216, the filter guide 228, and some of the magnets 222. Additionally, FIG. 3B illustrates a hook 330 (e.g., sometimes referred to as a hanger bracket) that is configured to enable the filter rack 100 to couple to the blower coil unit 102. In the illustrated example, the hook 330 extends from the rear edge 308 of the side 202. Additionally or alternatively, the filter rack 100 includes a hook (e.g., substantially similar and/or identical to the hook 330) that extends from a read edge of the side 204. Further, the hook 330 of the illustrated example extends from a portion of the end panel 216 that folds over and couples to a portion of one of the posts 302. In other examples, the hook 330 may protrude from one of the posts 302 and/or any other portion of the rear frame structure 108.

Figure 4A:
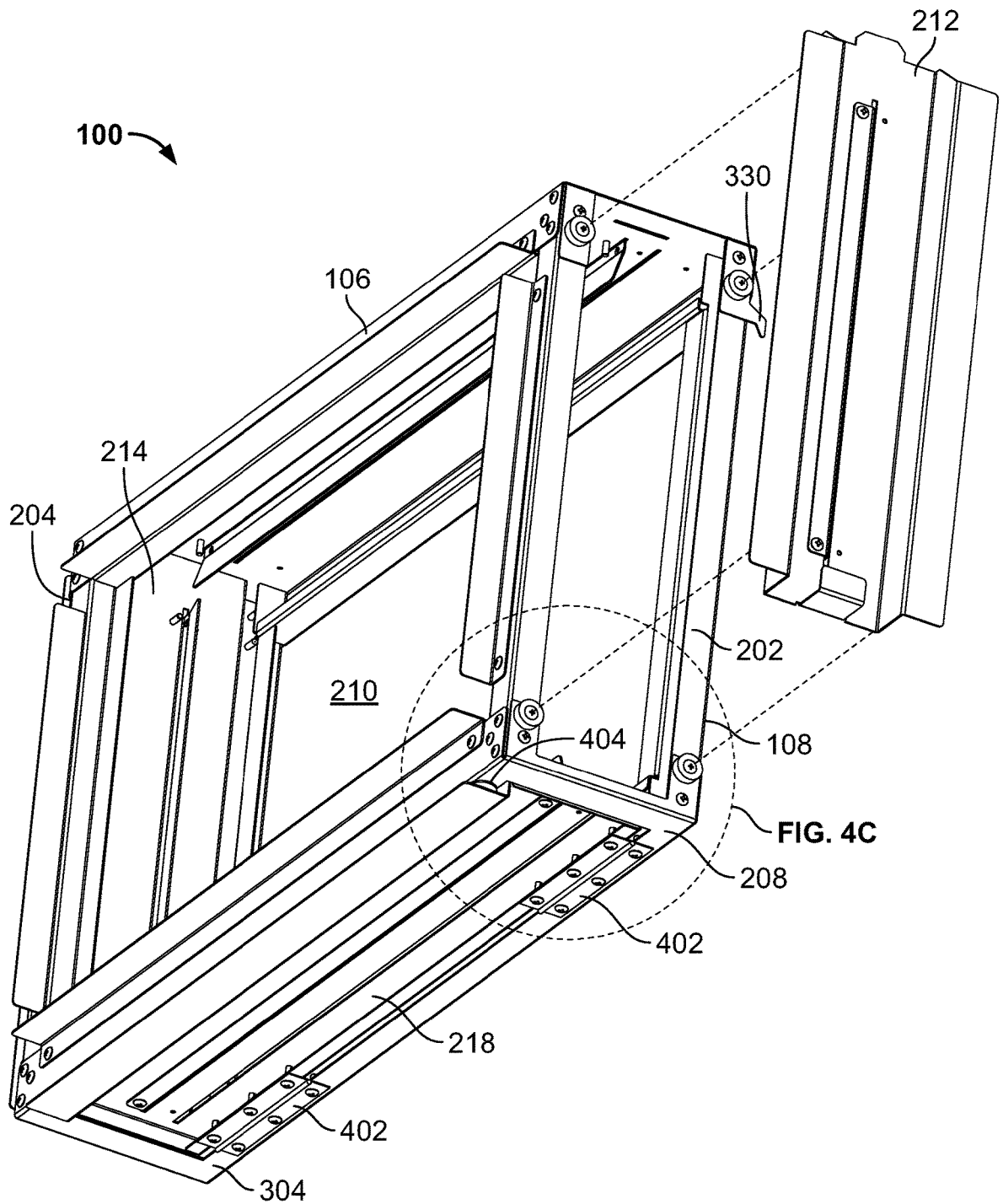
FIG. 4A further illustrates the frame, the side panels, and a rotatable panel of the filter rack of FIG. 1.

FIG. 4A further illustrates the filter rack 100. In the illustrated example, the side panel 212 is decoupled form the side 202 of the frame 106, the side panel 214 is coupled to the side 204 of the frame 106, and the rotatable panel 218 is coupled to the end 208 of the frame 106 in a closed position. As illustrated in FIG. 4A, the rotatable panel 218 hingedly coupled to the end panel 304 at the end 208 of the frame 106 via one or more hinges 402.

Figure 4B:
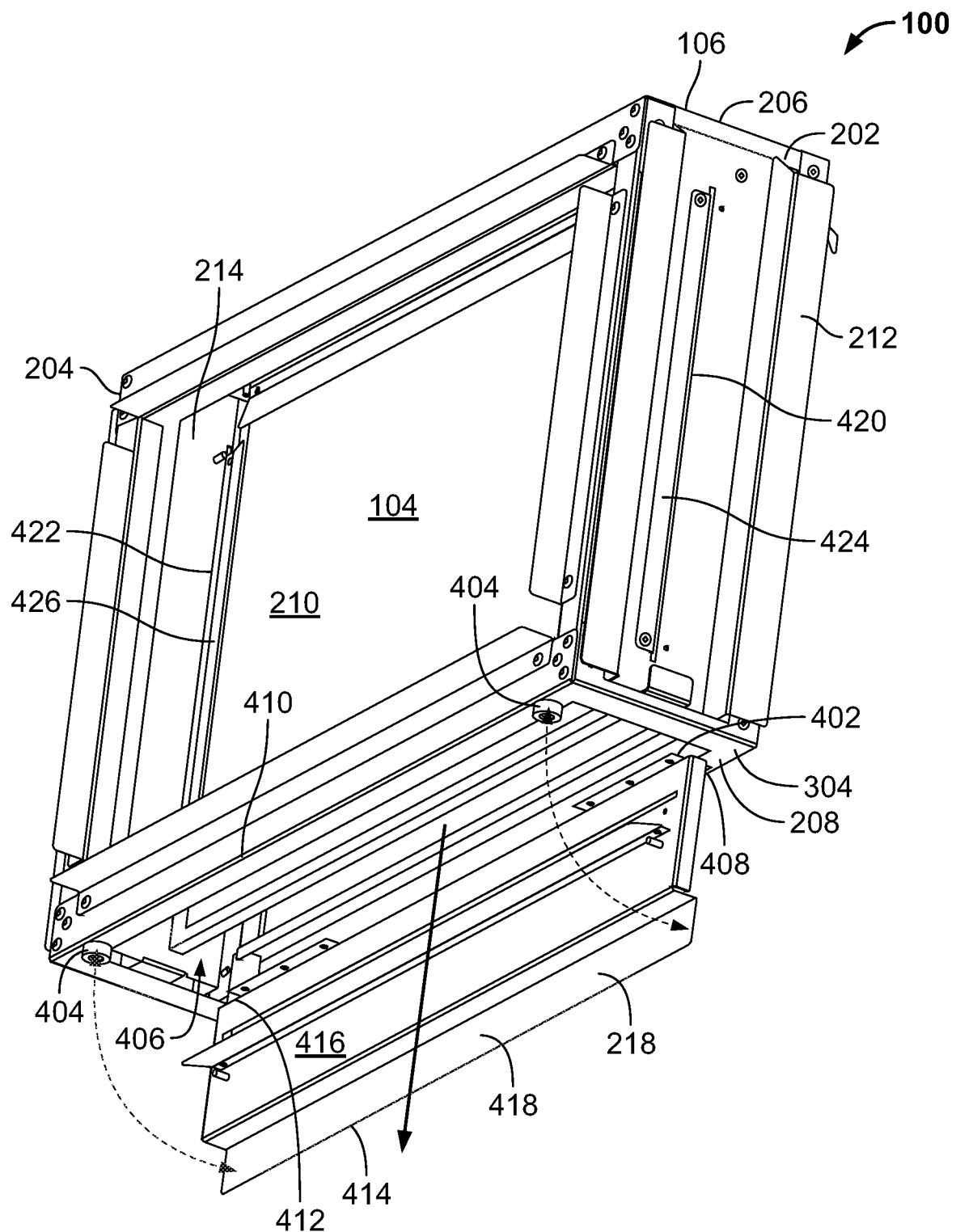
FIG. 4B depicts the filter rack of FIG. 1 when the rotatable panel is rotated open.

In the illustrated example, the filter rack 100 is oriented such that the end 208 is a bottom end and the rotatable panel 218 is configured to rotate upwardly to a closed position (as shown in FIG. 4A) and downwardly to an open position (as shown in FIG. 4B). In other examples, the filter rack 100 is oriented such that the end 208 is a top end and the rotatable panel 218 is configured to rotate upwardly to the open position and downwardly to the closed position. That is, the rear frame structure 108 of the filter rack 100 is configured to hang from the blower coil unit 102 (e.g., via the hook 330 and/or other fastening device(s) such as other hook(s)) such that the end 208 is the top end of the frame 106 or the bottom end of the frame 106.

The filter rack 100 also includes one or more magnets 404 (sometimes referred to as first magnets or third magnets) that are fixed along the end 208 of the frame 106 to enable the rotatable panel 218 to rest in a closed position. For example, the magnets 404 are fixed to the end panel 304. In some examples, the rotatable panel 218 includes magnetic material to enable the rotatable panel 218 to magnetically couple to the magnets 404 (e.g., including a first magnet or third magnet) located along the end 208 of the frame 106. Additionally or alternatively, one or more magnets are fixed to the rotatable panel 218 and are configured to magnetically couple the rotatable panel 218 to the magnets 404. As illustrated in FIG. 4A, the rotatable panel 218 is magnetically coupled to the magnets 404 in the closed position to securely enclose a filter (e.g., the filter 104) within the slot 210 of the filter rack 100.

As illustrated in FIG. 4B, the rotatable panel 218 is decoupled from the magnets 404 in the open position to provide access to the slot 210 via an opening 406 (sometimes referred to as a first opening or a third opening). That is, FIG. 4B depicts the filter rack 100 when the rotatable panel 218 is rotated to the open position such that the opening 406 is uncovered. In the illustrated example, the end panel 304 at the end 208 of the frame 106 defines the opening 406 to the slot 210. The opening 406 provides access to the slot 210 to enable a technician to remove the filter 104 from, insert the filter 104 into, and/or otherwise access the filter 104 within the slot 210 of the filter rack 100. For example, to replace a dirty filter with a clean filter, the technician initially decouples the rotatable panel 218 from the magnets 404 to access the slot 210 via the opening 406. Subsequently, the technician removes the dirty filter through the opening 406 and inserts the clean filter into the slot 210 of the filter rack 100 via the opening 406. After the clean filter is positioned within the slot 210, the technician recouples the rotatable panel 218 to the magnets 404 to securely enclose the clean filter within the slot 210 of the filter rack 100.

In the illustrated example, the hinges 402 are positioned along a rear edge 408 of the end 208, and the magnets 404 are positioned along a front edge 410 of the end 208 opposite the rear edge 408. The hinges 402 are positioned along the rear edge 408 and the magnets 404 are positioned along the front edge 410 such that the hinges 402 and the magnets 404 do not extend into the opening 406 defined by the end 208.

The rotatable panel 218 of the illustrated example includes a first side 412, a second side 414 opposite the first side 412, and a middle portion 416 between the first side 412 and the second side 414. As illustrated in FIG. 4B, the first side 412 is coupled to the hinges 402 such that the first side 414 is hingedly coupled to the end 208, and the second side 414 is configured to magnetically couple to the magnets 404 when the rotatable panel 218 is in the closed position. The middle portion 416 is configured to cover the opening 406 when the rotatable panel 218 is coupled to the magnets 404 in the closed position. Further, the second side 414 of the illustrated example includes a flange 418 that is configured to extend beyond the front edge 410 of the frame 106 when the rotatable panel 218 is in the closed position. For example, the flange 418 extends beyond the frame 106 to facilitate a technician in grasping the rotatable panel 218 while transitioning the rotatable panel 218 between the closed position and the open position.

In FIG. 4B, the side panel 212 is coupled to the side 202 of the frame 106, and the side panel 214 is coupled to the side 204 of the frame 106. As illustrated in FIG. 4B, the side panel 212 defines a slit 420 that is configured to extend between the end 206 and the end 208 when the side panel 212 is coupled to the side 202. Further, the side panel 214 defines a slit 422 that is configured to extend between the end 206 and the end 208 when the side panel 214 is coupled to the side 214. Additionally, as illustrated in FIG. 4B, the filter rack 100 includes a filter guide 424 and another filter guide 426 (sometimes referred to as stoppers). The filter guide 424 is configured to be inserted into the slit 420 and coupled to the side panel 212 (e.g., via one or more fasteners). Further, the filter rack 100 includes another filter guide 426 that is configured to be inserted into the slit 422 and coupled to the side panel 214 (e.g., via one or more fasteners). The filter guide 424 and the filter guide 426 extend along the side panel 212 and the side panel 214, respectively, to guide the filter 104 into and/or out of slot 210 via the opening 406. The filter guide 424 and the filter guide 426 also are configured to securely position the filter within the slot 210 of the filter rack 100.

In the illustrated example, each of the side panels 212, 214 defines a single slit through which the respective filter guides 424, 426 are configured to be inserted. In other examples, the side panel 212 and/or side panel 214 may define a plurality of slits (e.g., 2 slits, 3 slits, etc.) that are parallel to each other to enable the respective filter guides 424, 426 adjustably positioned to guide filters of different sizes into and/or out of the slot 210.

Figure 4C:
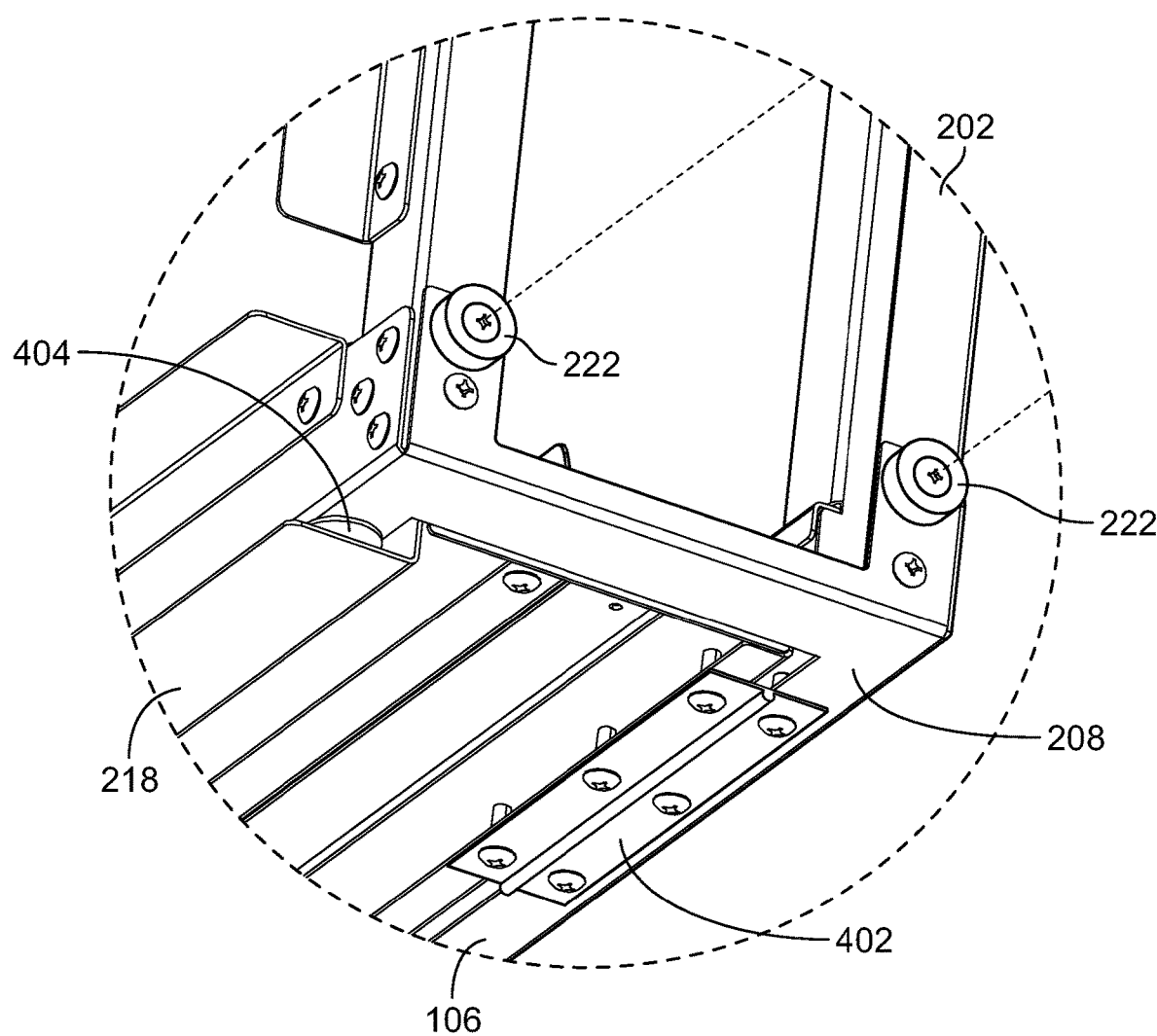
FIG. 4C is a magnified view of a section of the frame identified in FIG. 4A.

FIG. 4C is a magnified view of a section of the frame 106 identified in FIG. 4A. For example, FIG. 4C further depicts a portion of the side 202 and a portion of the end 208 of the frame 106. In the illustrated example, the magnets 222 fixed to the side 202 are exposed as a result of the side panel 214 being decoupled from the magnets 222. Further, in the illustrated example, the rotatable panel 218 is in the closed position such that the rotatable panel 218 is hingedly coupled to the end 208 via the hinges 402 and is also magnetically coupled to the end 208 via the magnets 404.

Figure 4D:
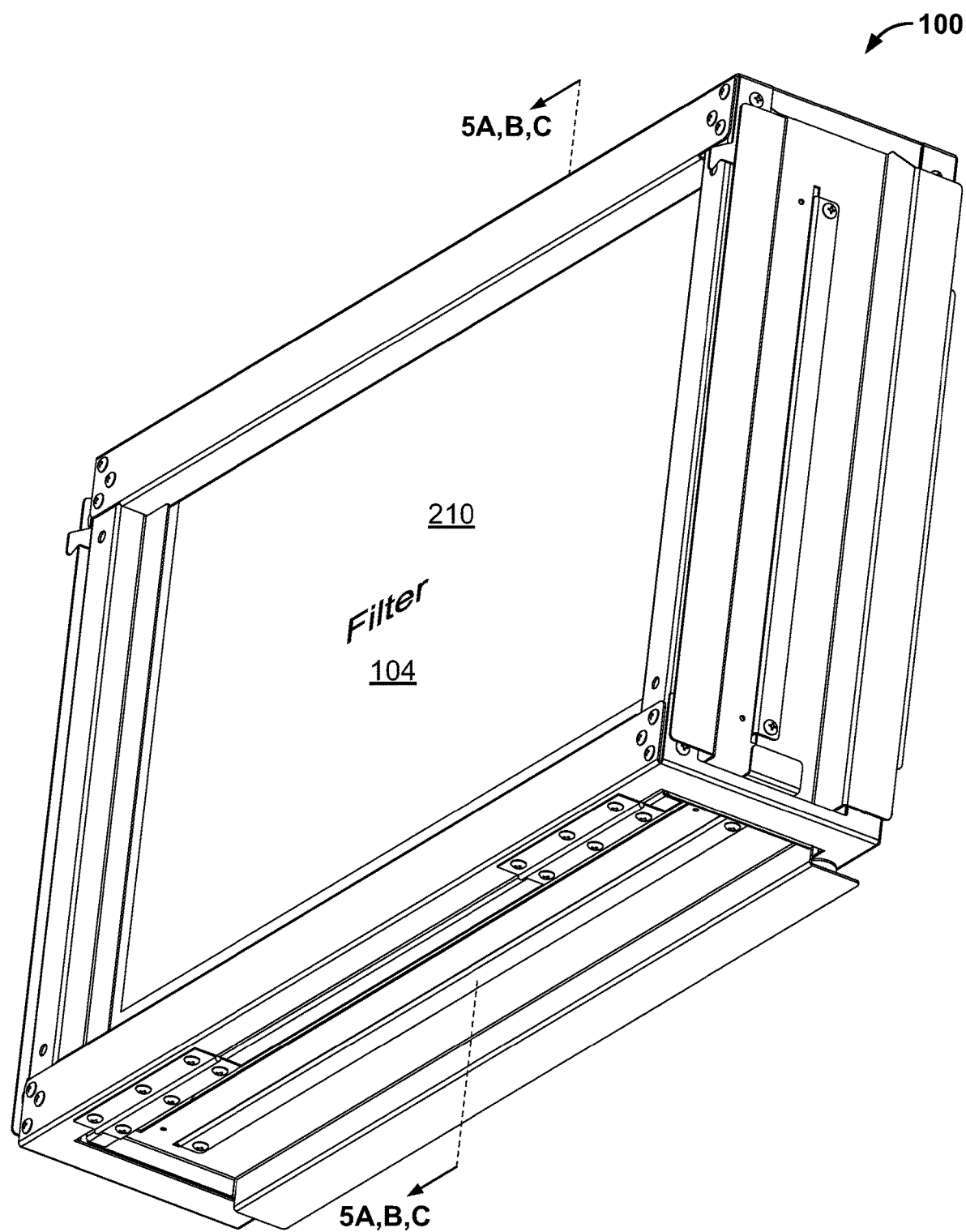
FIG. 4D further illustrates the filter rack and the filter of FIG. 1.

FIG. 4D further illustrates the filter rack 100 when the filter 104 is securely enclosed within the slot 210.

Figure 5A:
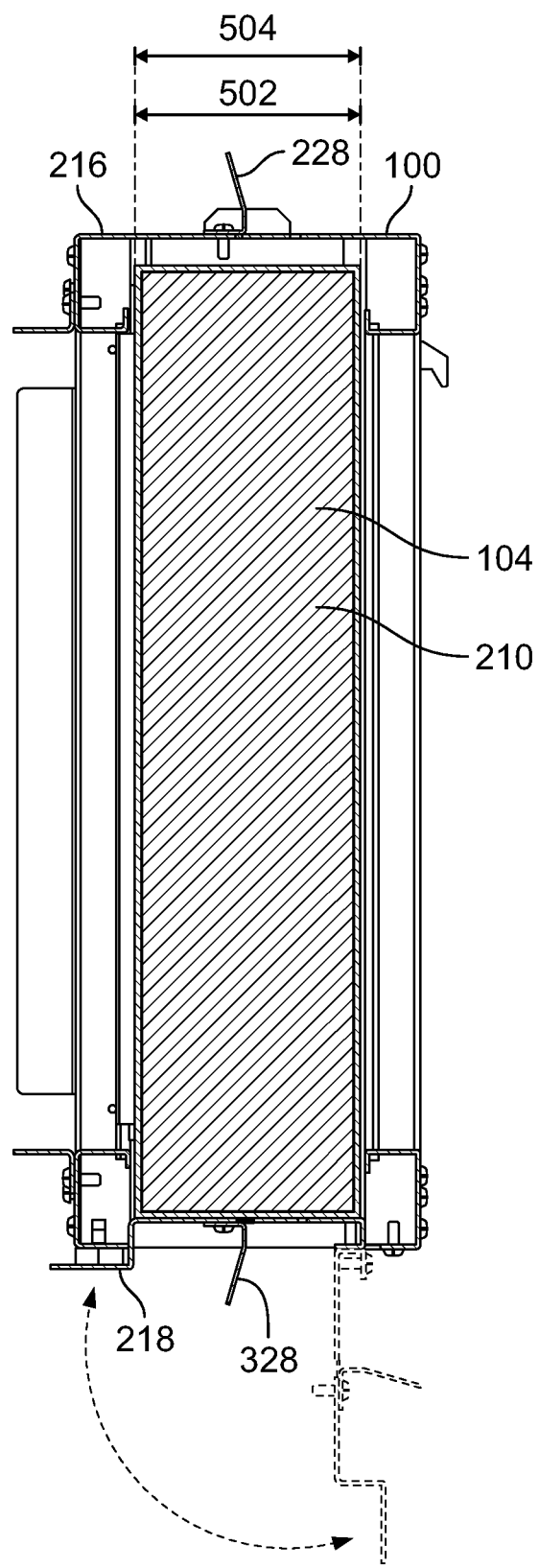
FIG. 5A is a cross-section of the filter rack of FIG. 1 and a first filter taken along the line identified in FIG. 4D.
Figure 5B:
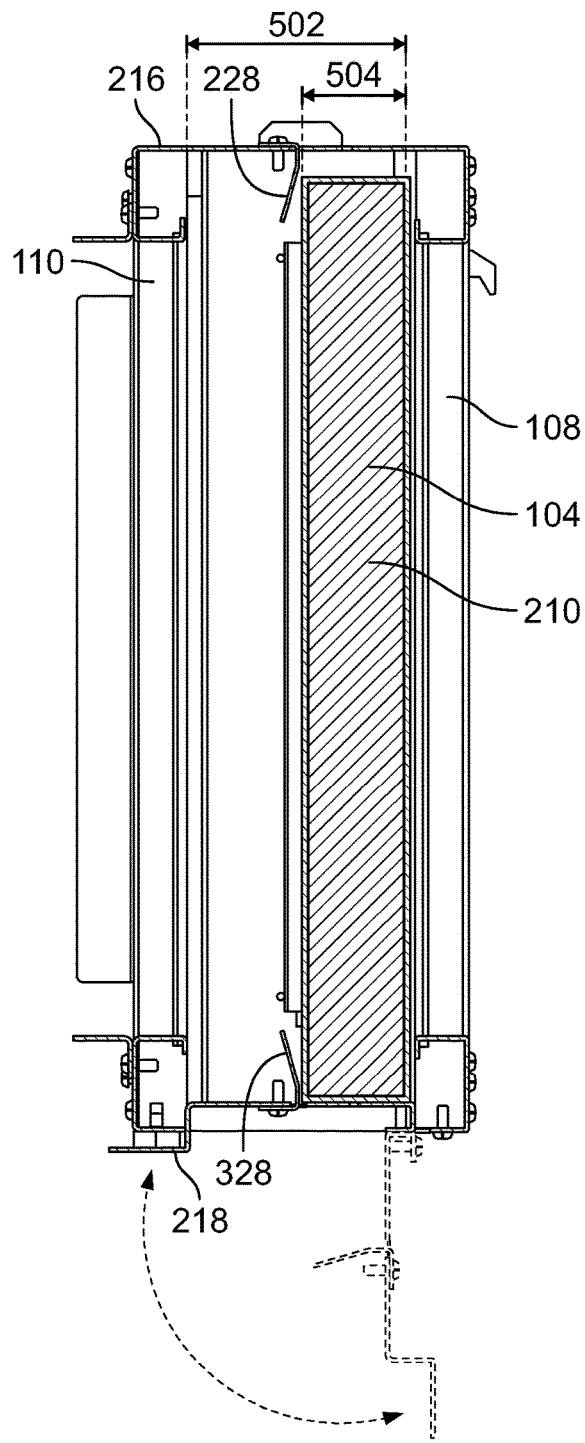
FIG. 5B is a cross-section of the filter rack of FIG. 1 and a second filter taken along the line identified in FIG. 4D.
Figure 5C:
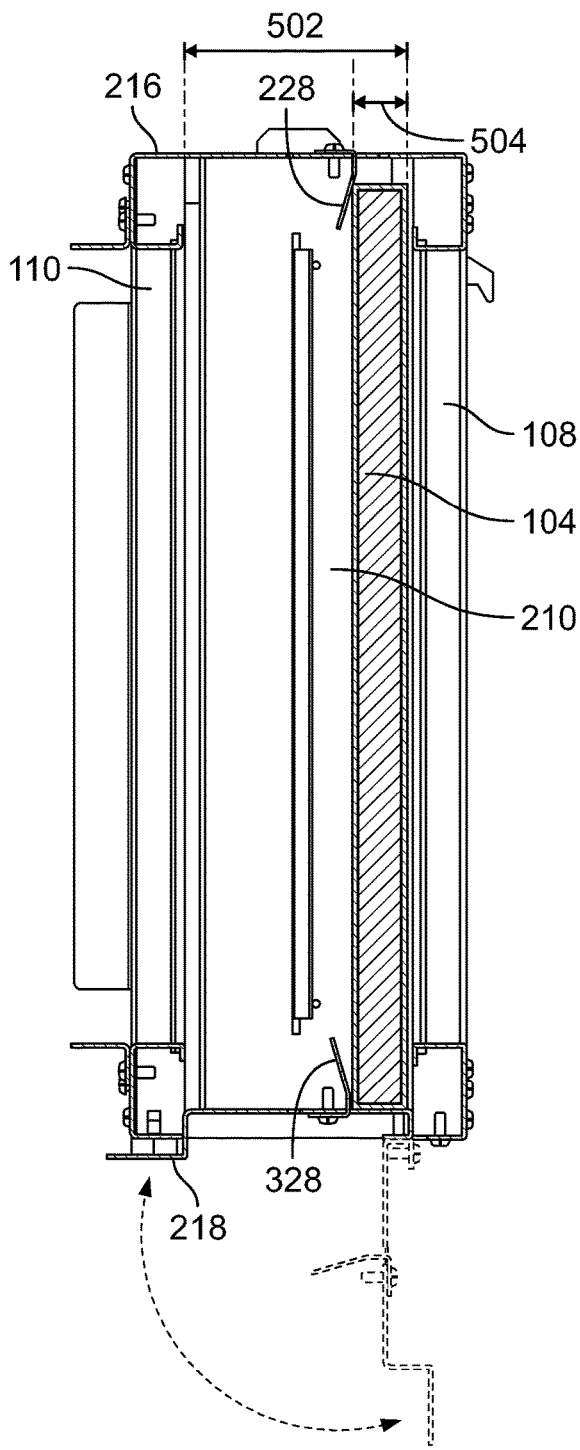
FIG. 5C is a cross-section of the filter rack of FIG. 1 and a third filter taken along the line identified in FIG. 4D.

FIGS. 5A-5C are cross-sections of the filter rack 100 housing examples of the filter 104 that are taken along the line identified in FIG. 4D. As illustrated in FIG. 5A-5C, the slot 210 of the filter rack 100 in which the filter 104 is housed has a thickness 502 (e.g., of about 4 inches). Further, the filter 104 has a thickness 504 that is less than or equal to the thickness 502 of the slot 210. Additionally, FIGS. 5A-5C depict the filter rack 100 when the rotatable panel 218 is in the closed position to enclose the filter 104 within the slot 210. FIGS. 5A-5C also include dashed lines that depict (1) the rotatable panel 218 in the open position and (2) movement of the rotatable panel 218 between the closed position and the open position.

In FIG. 5A, the thickness 504 of the filter 104 equal and/or is substantially similar to the thickness 502 of the slot 210. For example, each of the thickness 504 of the filter 104 and the thickness 502 of the slot 210 is about 4 inches. In the illustrated example, the filter guide 228 and the filter guide 328 are coupled to the end panel 216 and the rotatable panel 218, respectively, in an inverted manner to enable the filter 104 to be housed within the slot 210. That is the filter guide 228 and the filter guide 328 are not inserted into one of the slits 230 and the slits 326, respectively, to prevent the filter guide 228 and/or the filter guide 328 from interfering with the filter 104 within the slot 210. Rather, the filter guide 228 is coupled to the end panel 216 such that the filter guide 228 extends away from the slot 210, and the filter guide 328 is coupled to the rotatable panel 218 such that the filter guide 328 extends away from the slot 210. In other examples, the filter guide 228 and the filter guide 328 are decoupled from the end panel 216 and the rotatable panel 218, respectively, to prevent the filter guide 228 and/or the filter guide 328 from interfering with the filter 104 within the slot 210.

In FIG. 5B, the thickness 504 of the filter 104 is significantly less than the thickness 502 of the slot 210. For example, the thickness 504 of the filter 104 (e.g., of about 2 inches) is about half the thickness 502 of the slot 210 (e.g., of about 4 inches). In the illustrated example, the filter guide 228 is inserted into the second slit 230b and coupled to the end panel 216, and the filter guide 328 is inserted into the second slit 326b and coupled to the rotatable panel 218 to guide the filter 104 into and/or to securely house the filter 104 within the slot 210 of the frame 106. For example, the filter guide 228 and the filter guide 328 securely clamp the filter 104 against the rear frame structure 108. In other examples, the filter 104 is inserted into the slot 210 such that the filter guide 228 and the filter guide 328 securely clamp the filter 104 against the front frame structure 110. Further, in some examples, the filter guide 228 and the filter guide 328 enable the slot 210 to simultaneously house two filters (e.g., the filter 104 and another filter identical and/or substantially similar to the filter 104) securely within the slot 210 of the filter rack 100. In such examples, the filter guide 228 and the filter guide 328 securely clamp one of the filters against the rear frame structure 108 and the other of the filters against the front frame structure 110.

In FIG. 5C, the thickness 504 of the filter 104 is significantly less than the thickness 502 of the slot 210. For example, the thickness 504 of the filter 104 is 1 inch and the thickness 502 of the slot 210 is about 4 inches. In the illustrated example, the filter guide 228 is inserted into the first slit 230a and coupled to the end panel 216, and the filter guide 328 is inserted into the first slit 326a and coupled to the rotatable panel 218 to guide the filter 104 into and/or to securely house the filter 104 within the slot 210 of the frame 106. For example, the filter guide 228 and the filter guide 328 securely clamp the filter 104 against the rear frame structure 108.

Figure 6:
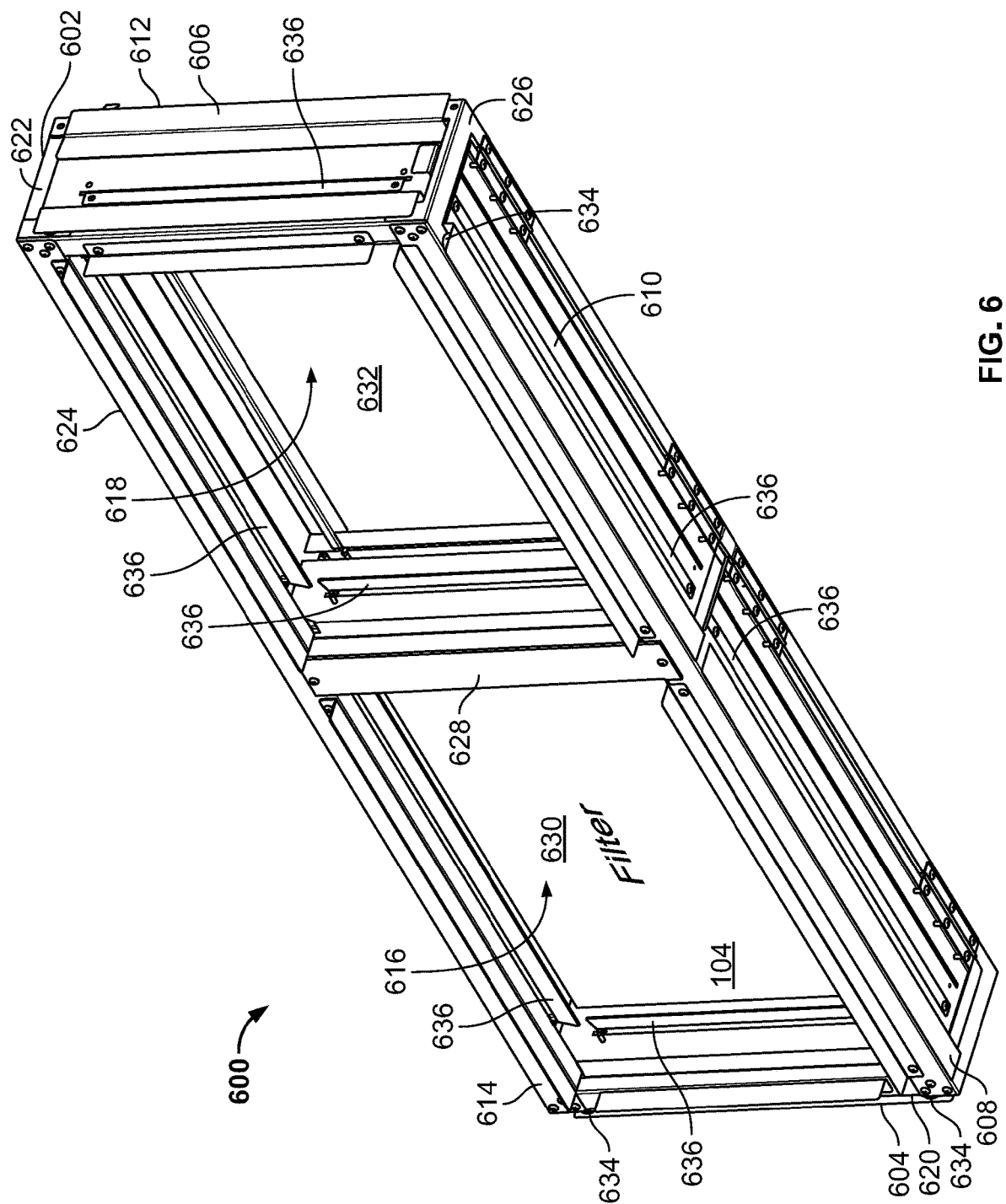
FIG. 6 illustrates another example filter rack and filters for a blower coil unit in accordance with the teachings herein.
Figure 7:
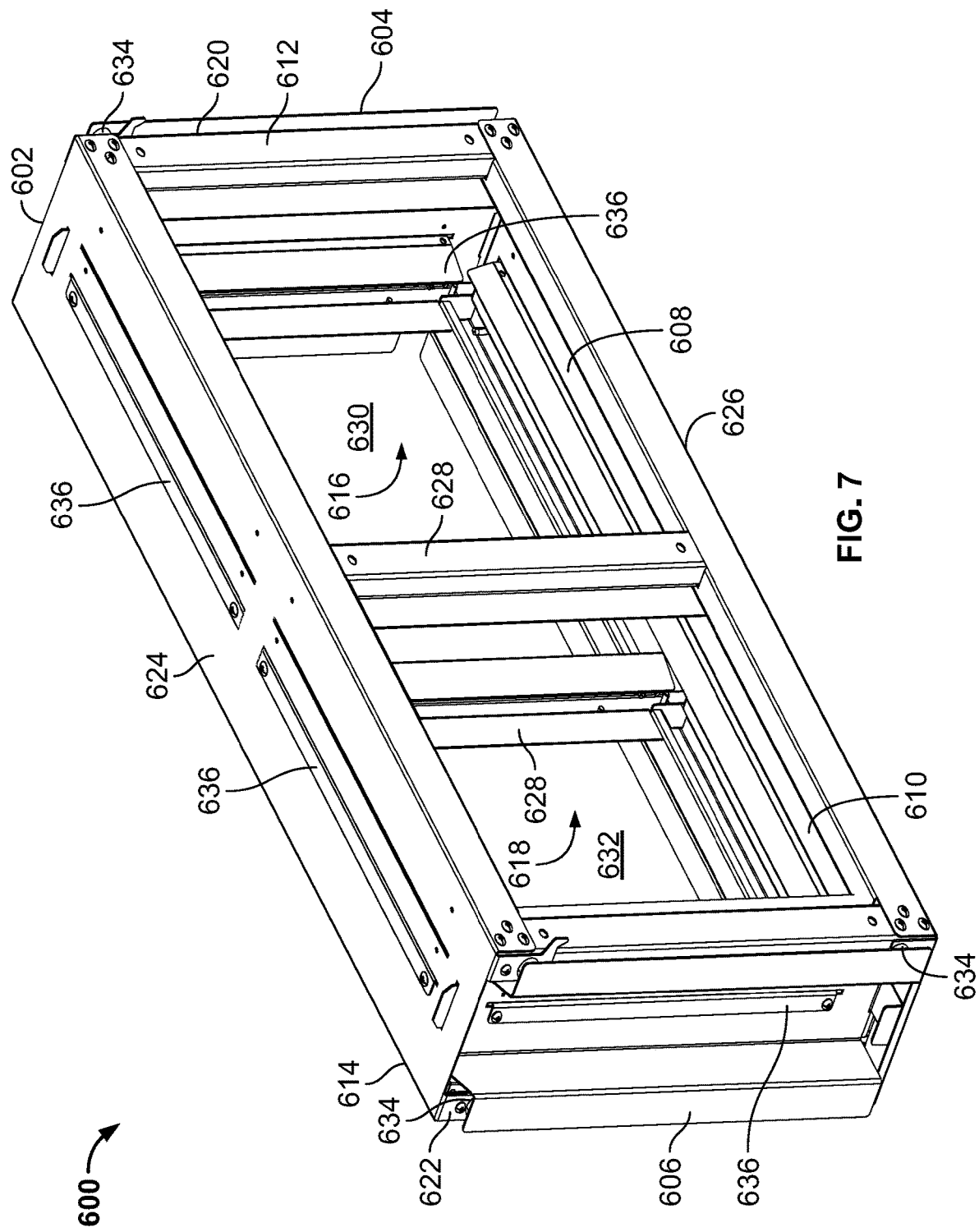
FIG. 7 depicts another view of the filter rack of FIG. 6.

FIGS. 6 and 7 illustrate another example filter rack 600 for housing filters for a blower coil unit (e.g., the blower coil unit 102) in accordance with the teachings herein. As illustrated in FIGS. 6 and 7, the filter rack 600 is configured to house one or more filters (e.g., the filter 104) for the blower coil unit. The filter rack 600 includes a frame 602, a side panel 604 (sometimes referred to as a first side panel), a side panel 606 (sometimes referred to as a second side panel), a rotatable panel 608 (sometimes referred to as a first rotatable panel), and a rotatable panel 610 (sometimes referred to as a second rotatable panel).

The side panel 604 of the filter rack 600 is identical and/or substantially similar to the side panel 212 of the filter rack 100 of FIGS. 1-5C, and the side panel 606 of the filter rack 600 is identical and/or substantially similar to the side panel 214 of the filter rack 100 of FIGS. 1-5C. Further, each of the rotatable panel 608 and the rotatable panel 610 is identical and/or substantially similar to the rotatable panel 218 of the filter rack 100 of FIGS. 1-5C. Because the side panel 212, the side panel 214, and the rotatable panel 218 have been disclosed in detail with respect to FIGS. 1-5C, some features of the side panel 604, the side panel 606, the rotatable panel 608, and the rotatable panel 610 will not be discussed in further detail below.

As illustrated in FIGS. 6 and 7, the frame 602 includes a rear frame structure 612 and a front frame structure 614 that are spaced apart from and coupled to each other. In the illustrated example, the frame 602 defines an air passageway 616 (sometimes referred to as a first air passageway) and another air passageway 618 (sometimes referred to as a second air passageway) that are arranged in a side-by-side manner. Further, the frame 602 includes a side 620 (sometimes referred to as a first side), a side 622 (sometimes referred to as a second side) opposite the side 620, an end 624 (sometimes referred to as a first end or side), and an end 626 (sometimes referred to as a first end or side) opposite the end 624. For example, each of the side 620, the side 622, the end 624, and the end 626 extend between the rear frame structure 612 and the front frame structure 614. Additionally, the side 620 and the side 622 extend between the end 624 and the end 626, and the end 624 and the end 626 extend between the side 620 and the side 620. In the illustrated example, the frame 602 also includes a mullion 628. The mullion 628 (1) is coupled to and extends between the end 624 and the end 626 and (2) is positioned between the side 622 and the side 624 of the frame 602 to define the air passageway 616 and the air passageway 618 in the side-by-side manner.

The frame 602 of the illustrated example defines a slot 630 (sometimes referred to as a first slot) in which a filter is to be positioned for the air passageway 616. Further, the frame 602 defines another slot 632 (sometimes referred to as a second slot) in which a filter is to be positioned for the air passageway 618. As illustrated in FIGS. 6 and 7, the slot 630 and the slot 632 are arranged in a side-by-side manner. For example, the side 620, the end 624, the end 626, and the mullion 628 define the slot 630. Further, the 622, the end 624, the end 626, and the mullion 628 define the slot 632. When a filter (e.g., the filter 104) is housed within the slot 630, the filter is positioned within a portion of the air passageway 616 to filter air that is blown from and/or to a blower coil unit. Further, when a filter (e.g., the filter 104) is housed within the slot 632, the filter is positioned within a portion of the air passageway 618 to filter air that is blown from and/or to the blower coil unit.

In the illustrated example, the side 620 is substantially similar and/or identical to the side 202 of the filter rack 100 of FIGS. 1-5C. For example, the side 620 defines an opening (sometimes referred to as a side opening) to the slot 630 that is substantially similar and/or identical to the opening 220 of the slot 210. Further, the side 622 is substantially similar and/or identical to the side 204 of the filter rack 100 of FIGS. 1-5C. For example, the side 620 defines an opening (sometimes referred to as a side opening) to the slot 632 that is substantially similar and/or identical to the opening 224 of the slot 210. Additionally, the end 626 is similar to the end 208 of the filter rack 100 of FIGS. 1-5C. For example, the end 626 defines an opening (sometimes referred to as a side or end opening) to the slot 630 that is substantially similar and/or identical to the opening 406 of the slot 210 and defines an opening (sometimes referred to as a side or end opening) to the slot 632 that is substantially similar and/or identical to the opening 406. The openings of the frame 602 enable a technician to remove a filter from, insert a filter into, and/or otherwise access a filter within the slot 630 and/or the slot 632. Because the side 202, the side 204, and the end 208 have been disclosed in detail with respect to FIGS. 1-5C, some features of the side 620, the side 622, and the end 626 of the frame 602 will not be discussed in further detail below.

The end 624 of the illustrated example also is similar to the end 208 of the frame 106 of FIGS. 1-5C. For example, the end 624 defines slits for the side panel 604 and the side panel 606, respectively, that are each substantially similar and/or identical to the slit 324 of the end 208 of FIGS. 1-5C. Further, the end 624 defines slits for filter guides of the slot 630 and the slot 632, respectively, that are each substantially similar and/or identical to the slits 230 of the end 208 of FIGS. 1-5C. Because the end 208 has been disclosed in detail with respect to FIGS. 1-5C, some features of the end 624 will not be discussed in further detail below.

As illustrated in FIGS. 6 and 7, the filter rack 600 of the illustrated example includes magnets 634 that are fixed to the side 620, the side 622, and the end 626. The magnets 634 are substantially similar and/or identical to the magnets 222, the magnets 226, and/or the magnets 404 of the filter rack 100 of FIGS. 1-5C. Because the magnets 222, the magnets 226, and the magnets 404 have been disclosed in detail with respect to FIGS. 1-5C, some features of the magnets 634 will not be discussed in further detail below. The filter rack 600 of the illustrated example also includes filter guides 636 (sometimes referred to as stoppers) that are configured to guide a filter into and/or securely house a filter within the filter rack 600. The filter guides 636 of the filter rack 600 are substantially similar and/or identical to the filter guide 228, the filter guide 328, and/or the filter guide 424 of the filter rack 100 of FIGS. 1-5C. Because the filter guide 228, the filter guide 328, and the filter guide 424 have been disclosed in detail with respect to FIGS. 1-5C, some features of the filter guides 636 will not be discussed in further detail below. Further, in the illustrated example, one of the filter guides 636 is coupled to the mullion 628 for the slot 630, and another of the filter guides 636 is coupled to the mullion 628 for the slot 632.

In the illustrated example, the side panel 604 and the rotatable panel 608 securely enclose a filter positioned within the slot 630 when the side panel 604 is coupled to the side 620 via one or more of the magnets 634 and the rotatable panel 608 is coupled to the end 626 via one or more of the magnets 634. For example, the side 620 defines an opening to the slot 630 that the side panel 604 is configured to cover, and the end 626 defines another opening to the slot 630 that the rotatable panel 608 is configured to cover in the closed position. Further, the side panel 604 provides access to the slot 630 when decoupled from the side 620 and/or the rotatable panel 608 provides access to the slot 630 when decoupled from the corresponding one or more of the magnets 634 positioned along the end 626.

Similarly, the side panel 606 and the rotatable panel 610 securely enclose a filter positioned within the slot 632 when the side panel 606 is coupled to the side 622 via one or more of the magnets 634 and the rotatable panel 610 is coupled to the end 626 via one or more of the magnets 634. For example, the side 622 defines an opening to the slot 632 that the side panel 606 is configured to cover, and the end 626 defines another opening to the slot 632 that the rotatable panel 610 is configured to cover in the closed position. Further, the side panel 606 provides access to the slot 630 when decoupled from the side 622 and/or the rotatable panel 610 provides access to the slot 632 when decoupled from the corresponding one or more of the magnets 634 positioned along the end 626.

Figure 8:
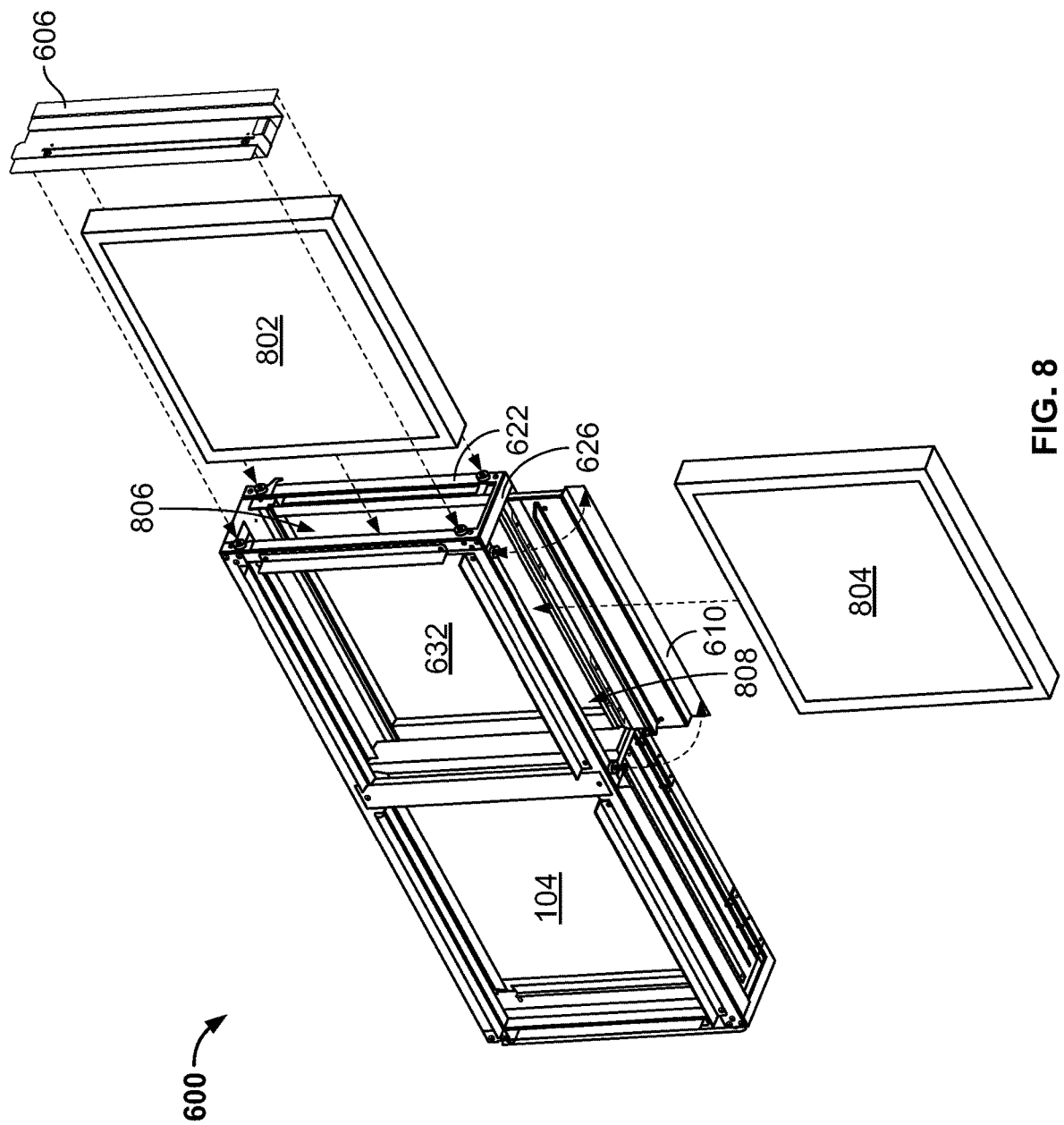
FIG. 8 depicts filters being inserted into filter rack of FIG. 6.

FIG. 8 depicts filters 802, 804 being inserted into the slot 632 of the filter rack 600. For example, each of the filters 802, 804 are substantially similar and/or identical to the filter 104 of FIGS. 1-5C. In the illustrated example, the filter 802 is being inserted into the slot 632 via an opening 806 defined by the side 622 of the frame 602 that is exposed as result of the side panel 606 being decoupled from the side 622. Further, the filter 804 is being inserted into the slot 632 via an opening 808 defined by the end 626 of the frame 602 that is exposed as result of the rotatable panel 610 being in an open position.

Figure 9:
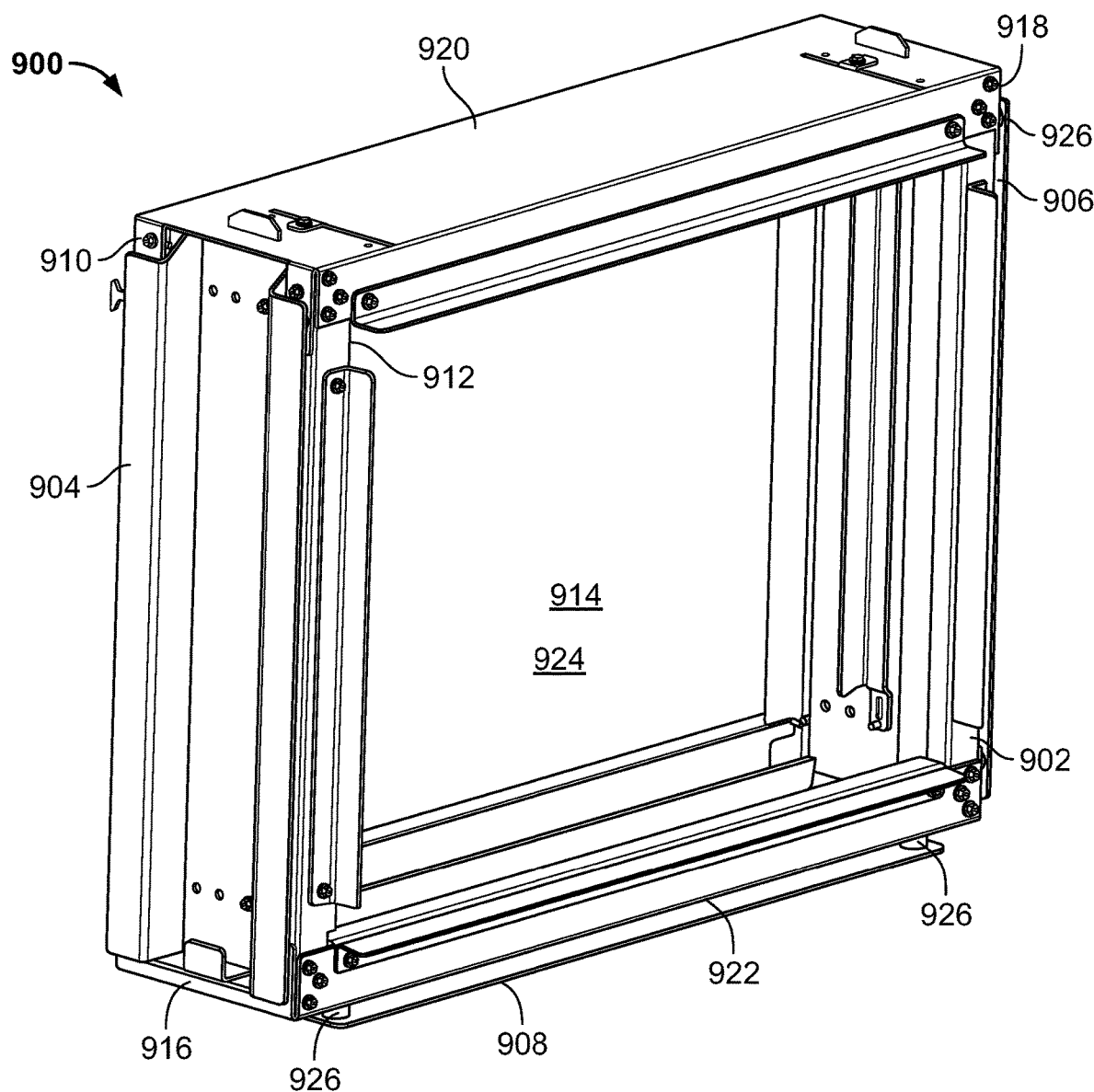
FIG. 9 illustrates another example filter rack for a blower coil unit in accordance with the teachings herein.

FIG. 9 illustrates another example filter rack 900 for housing filters for a blower coil unit (e.g., the blower coil unit 102) in accordance with the teachings herein. As illustrated in FIG. 9, the filter rack 900 is configured to house one or more filters (e.g., the filter 104, the filter 802, the filter 804) for the blower unit. The filter rack 900 includes a frame 902, a side panel 904 (sometimes referred to as a first side panel), a side panel 906 (sometimes referred to as a second side panel), and a rotatable panel 908 (sometimes referred to as an end panel).

The frame 902 of the illustrated example includes a rear frame structure 910 and a front frame structure 912 that are spaced apart from and coupled to each other. Further, the frame 902 defines an air passageway 914. The frame 902 of the illustrated example also includes a side 916 (sometimes referred to as a first side), a side 918 (sometimes referred to as a second side) opposite the side 916, an end 920 (sometimes referred to as a first end or side), and an end 922 (sometimes referred to as a first end or side) opposite the end 920. For example, each of the side 916, the side 918, the end 920, and the end 922 extend between the rear frame structure 910 and the front frame structure 912. Additionally, the side 916 and the side 918 extend between the end 920 and the end 922, and the end 920 and the end 922 extend between the side 916 and the side 918. Further, the frame 602 of the illustrated example defines a slot 924 in which a filter is to be positioned for the air passageway 914. For example, the side 916, the side 918, the end 920, and the end 922 define the slot 924. When a filter (e.g., the filter 104) is housed within the slot 630, the filter is positioned within a portion of the air passageway 616 to filter air that is blown from and/or to a blower coil unit. Further, when a filter (e.g., the filter 104, the filter 802, the filter 804) is housed within the slot 924, the filter is positioned within a portion of the air passageway 914 to filter air that is blown from and/or to the blower coil unit.

In the illustrated example, the side 916 is substantially similar and/or identical to the side 202 of the filter rack 100 of FIGS. 1-5C. For example, the side 916 defines an opening (sometimes referred to as a side opening) to the slot 924 that is substantially similar and/or identical to the opening 220 of the slot 210. Further, the side 918 is substantially similar and/or identical to the side 204 of the filter rack 100 of FIGS. 1-5C. For example, the side 918 defines an opening (sometimes referred to as a side opening) to the slot 924 that is substantially similar and/or identical to the opening 224 of the slot 210. Additionally, the end 922 is similar to the end 208 of the filter rack 100 of FIGS. 1-5C. For example, the end 922 defines an opening (sometimes referred to as a side or end opening) to the slot 924 that is substantially similar and/or identical to the opening 406 of the slot 210. The openings of the frame 902 enable a technician to remove a filter from, insert a filter into, and/or otherwise access a filter within the slot 924. Because the side 202, the side 204, and the end 208 have been disclosed in detail with respect to FIGS. 1-5C, some features of the side 916, the side 918, and the end 922 of the frame 902 will not be discussed in further detail below.

As illustrated in FIG. 9, the filter rack 900 of the illustrated example also includes magnets 926 that are fixed to the side 916, the side 918, and the end 922. The magnets 926 are substantially similar and/or identical to the magnets 222, the magnets 226, and/or the magnets 404 of the filter rack 100 of FIGS. 1-5C. Because the magnets 222, 226, 404 have been disclosed in detail with respect to FIGS. 1-5C, some features of the magnets 926 will not be discussed in further detail below. In the illustrated example, the side panel 904, the side panel 906, and the rotatable panel 908 securely enclose a filter positioned within the slot 924 when (i) the side panel 904 is coupled to the side 916 via one or more of the magnets 926, (ii) the side panel 906 is coupled to the side 918 via one or more of the magnets 926, and (iii) the rotatable panel 908 is coupled to the end 922 via one or more of the magnets 926. For example, the side 916 defines an opening to the slot 924 that the side panel 904 is configured to cover. Further, the side panel 904 provides access to the slot 924 when decoupled from one or more of the magnets 926 located on the side 916. Similarly, the side 918 defines an opening to the slot 924 that the side panel 906 is configured to cover, and the side panel 906 provides access to the slot 924 when decoupled from one or more of the magnets 926 located on the side 918. Additionally, the end 922 defines an opening to the slot 924 that the rotatable panel 908 is configured to cover in the closed position, and the rotatable panel 908 provides access to the slot 924 when decoupled from one or more of the magnets 926 located on the end 922.

Figure 10A:
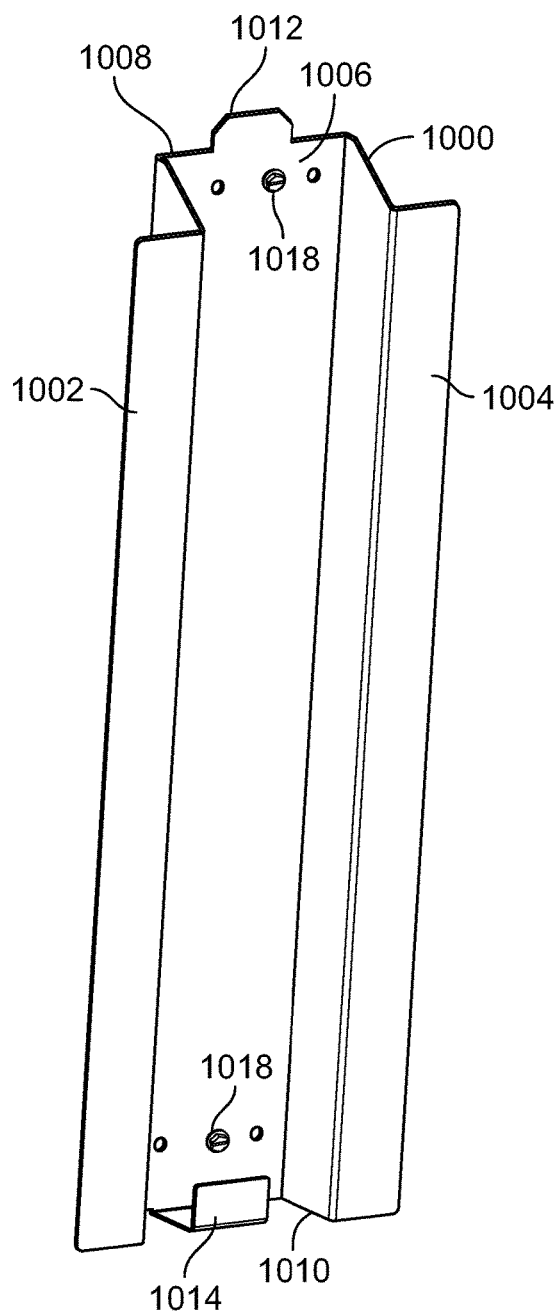
FIGS. 10A-10B depict a side panel and a filter guide of the filter rack of FIG. 9.
Figure 10B:
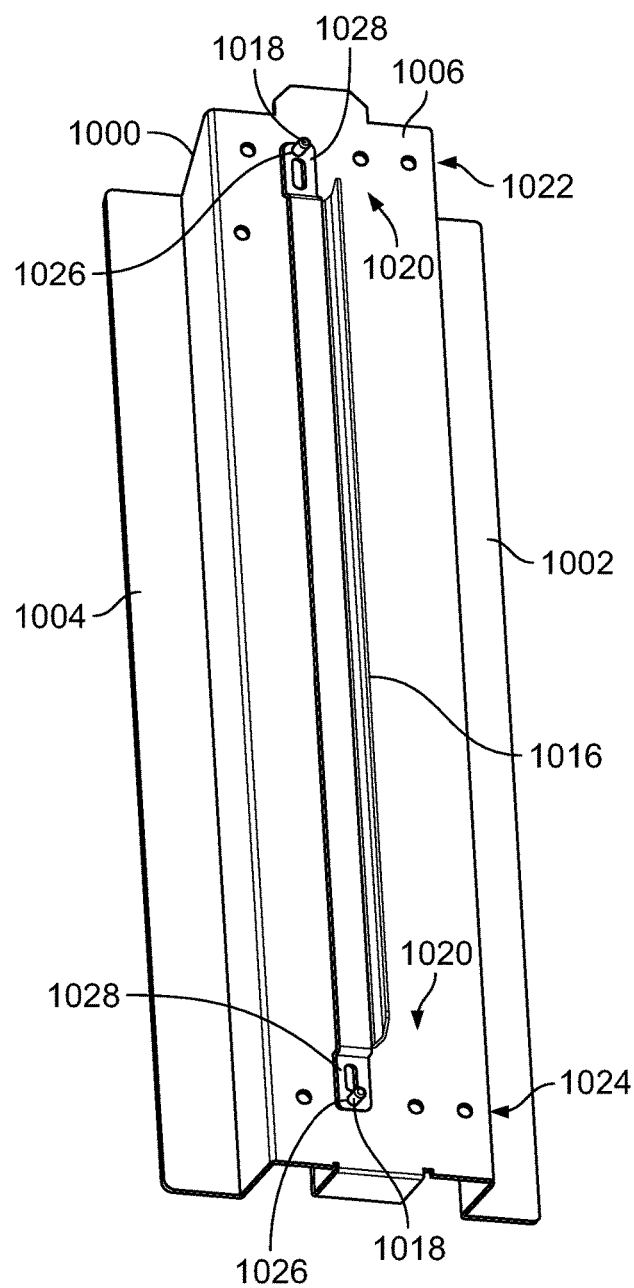

FIGS. 10A-10B depict an example side panel 1000 of the filter rack 900. For example, the side panel 1000 is representative of the side panel 904 and/or the side panel 906 of FIG. 9. As illustrated in FIG. 10, the side panel 1000 includes a flange 1002 (sometimes referred to as a first flange), a flange 1004 (sometimes referred to as a second flange) opposite the flange 1002, and a recessed portion 1006 extending between the flange 1002 and the flange 1004.

The flange 1002 is configured to couple to a side of the frame 902 along a first edge via one or more of the magnets 926, and the flange 1004 is configured to couple to the side of the frame 902 along an opposing second edge via one or more of the magnets 926. For example, the flange 1002 is configured to couple to the side 916 of the frame 902 along a rear edge, and the flange 1004 is configured to couple to the side 916 along an opposing front edge. Additionally or alternatively, the flange 1002 is configured to couple to the side 916 of the frame 902 along a front edge, and the flange 1004 is configured to couple to the side 916 along an opposing rear edge. Further, the recessed portion 1006 is configured to cover an opening of a slot when the side panel 1000 is coupled to a side of the frame 902. For example, the recessed portion 1006 is configured to extend into and cover an opening of the slot 924 when the side panel 1000 is coupled to the side 916 and/or 918.

Further, the side panel 1000 of the illustrated example includes an edge 1008 (sometimes referred to as a first edge) and an edge 1010 (sometimes referred to as a second edge) opposite the edge 1008. A tab 1012 extends from the edge 1008 along the recessed portion 1006, and a handle 1014 extends from the edge 1010 along the recessed portion 1006. As illustrated in FIG. 10A, the end panel 216 defines a slit 324 adjacent to the side 202 that corresponds with the tab 320 of the side panel 212. The tab 1012 is configured to be inserted into a slit defined by an end panel of the end 920 (e.g., a slit 1102 defined by an end panel 1100 of FIGS. 11A-11B) to securely couple the side panel 1000 to a side (e.g., the side 916, the side 918 of FIG. 9) of the frame 902. Further, the handle 1014 facilitates a technician in coupling and/or decoupling the side panel 1000 to and/or from the side. For example, to couple the side panel 1000 to a side of the frame 902, the technician is to (1) grasp the handle 1014, (2) position the side panel 1000 at an angle relative to the side such that the edge 1008 is closer to the side than the edge 1010 is, (3) insert the tab 1012 into the slit at the end 920, (4) rotate the edge 1010 of the side panel 1000 toward the side, and (5) magnetically couple the side panel 1000 to one or more of the magnets 926. To decouple the side panel 1000 from the side of the frame 902, the technician is to (1) grasp the handle 1014, (2) rotate the edge 1010 of the side panel 1000 away from the side of the frame 902 to decouple the side panel 1000 from the corresponding one(s) of the magnets 926, (3) remove the tab 1012 from the slit at the end 920, and (4) pull the side panel 1000 away from the side of the frame 902.

As illustrated in FIGS. 10A-10B, a filter guide 1016 is coupled to the side panel 1000 via fasteners 1018. When coupled to the side panel 1000, the filter guide 1016 extends along the side panel 1000 to guide a filter (e.g., the filter 104, the filter 802, the filter 804) into and/or out of slot 924 of the filter rack 900 via an opening defined by the end 922 of the frame 902. The filter guide 1016 also is configured to securely position the filter within the slot 924 of the filter rack 900.

In the illustrated example, the side panel 1000 defines a plurality of holes 1020 (sometimes referred to as apertures or openings) that are configured to receive the fasteners 1018 to couple the filter guide 1016 to the side panel 1000. For example, the plurality of holes 1020 defined by the side panel 1000 includes a first row of holes 1022 adjacent to the edge 1008 and a second row of holes 1024 adjacent to the edge 1010. The first row of holes 1022 and the second row of holes 1024 are parallel to each other. Further, in the illustrated example, each of the first row of holes 1022 is aligned with a respective one of the second row of holes 1024 in a manner that is parallel to the flanges 1002, 1004 and/or perpendicular to the edges 1008, 1010.

As illustrated in FIG. 10B, the filter guide 1016 defines an opening 1026 (e.g., a hole, a slot) at each of its ends 1028.

To couple the filter guide 1016 to the side panel 1000, the opening 1026 of one of the ends 1028 of the filter guide 1016 is aligned with one of the first row of holes 1022 and the opening 1026 of the other of the ends 1028 of the filter guide 1016 is aligned with a corresponding one of the second row of holes 1024. For example, when the filter guide 1016 is positioned in such a manner, the filter guide 1016 is parallel to the flanges 1002, 1004 and/or perpendicular to the edges 1008, 1010. Further, one of the fasteners 1018 is inserted through (i) the one of the first row of holes 1022 and (ii) the one of the openings 1026 of the filter guide 1016 that are aligned to couple the corresponding end 1028 of the filter guide 1016 to the side panel 1000. Another one of the fasteners 1018 is inserted through (i) the one of the second row of holes 1024 and (ii) the one of the openings 1026 of the filter guide 1016 that are aligned to couple the corresponding end 1028 of the filter guide 1016 to the side panel 1000. For example, one or more of the fasteners 1018 includes a screw and a nut that threadably mate to couple the filter guide 1016 to the side panel 1000.

In the illustrated example, the plurality of holes 1020 enable a position of the filter guide 1016 to be adjustable to enable filters of different sizes (e.g., about a 1-inch thickness, a 2-inch thickness, a 4-inch thickness, etc.) to be inserted into and securely housed within the slot 924. For example, the filter guide 1016 is positioned utilizing (i) a first of the first row of holes 1022 and the second row of holes 1024 to receive and secure a first filter size, (ii) a second of the first row of holes 1022 and the second row of holes 1024 to receive and secure a second filter size, (iii) a third of the first row of holes 1022 and the second row of holes 1024 to receive and secure a third filter size, and (iv) a first of the first row of holes 1022 and the second row of holes 1024 to receive and secure a fourth filter size.

Figure 11A:
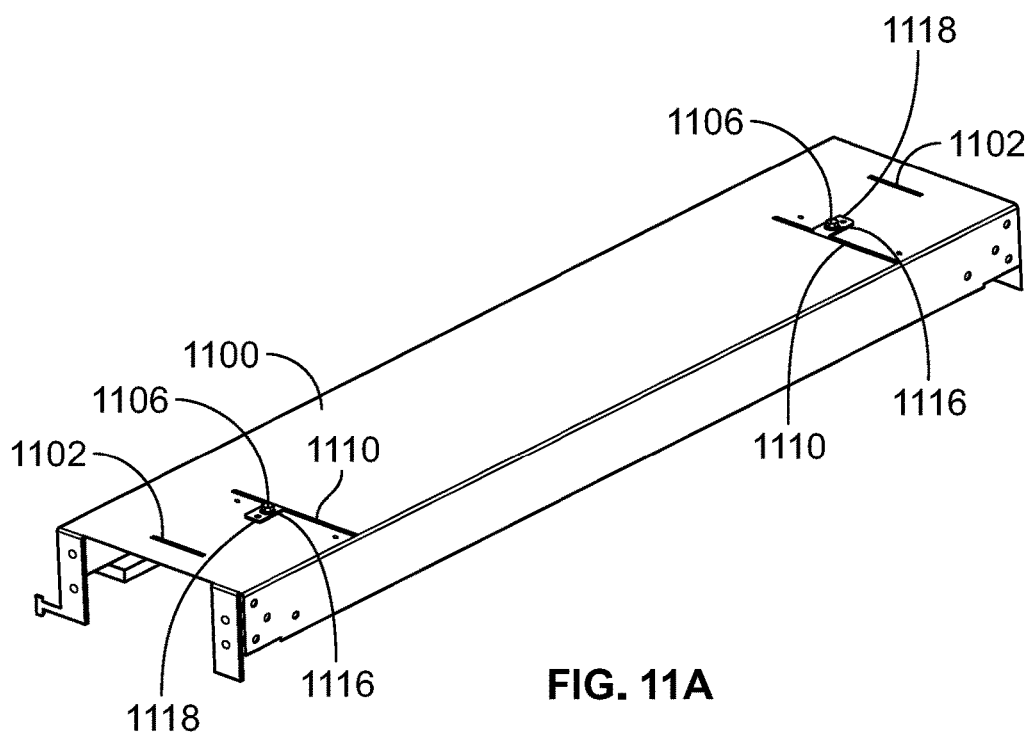
FIGS. 11A-11B depict an end panel and a filter guide of the filter rack of FIG. 9.
Figure 11B:
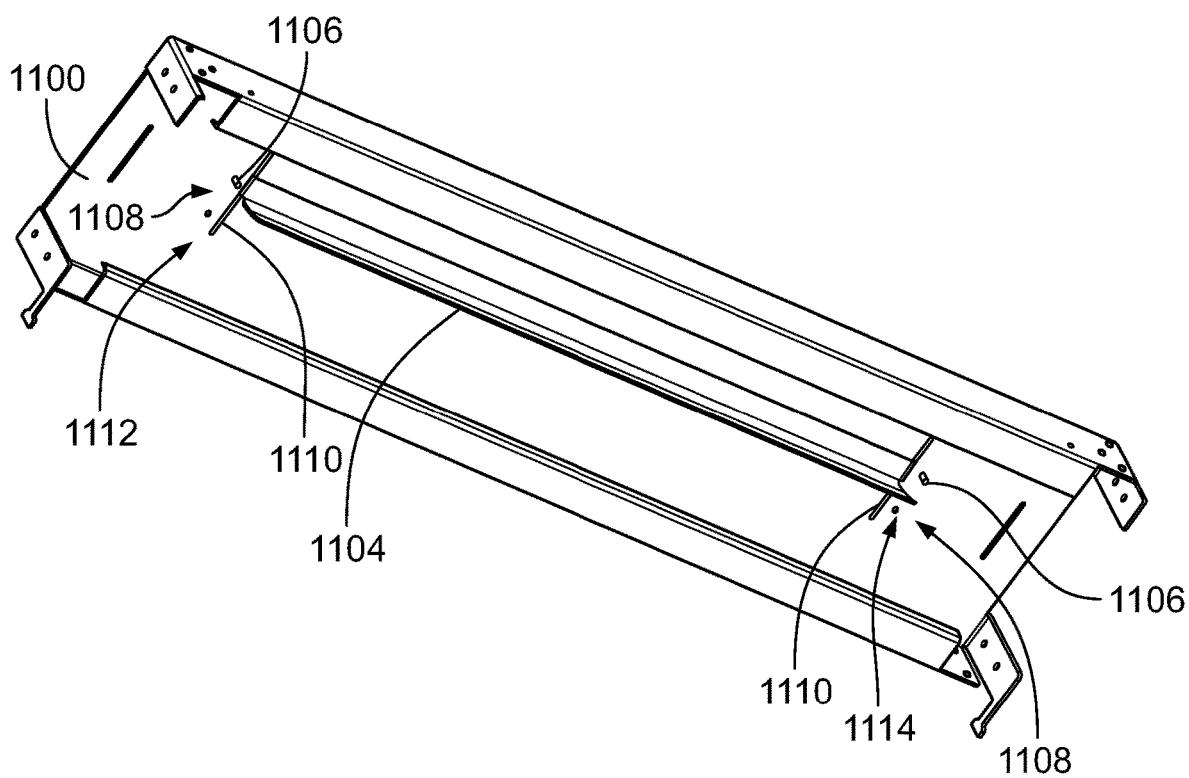

FIGS. 11A-11B depict an end panel 1100 located at the end 920 of the filter rack 900. In the illustrated example, the end panel 1100 defines slits 1102. One of the slits 1102 (sometimes referred to as a first slit) is adjacent to the side 916 of the frame 902, and another of the slits 1102 (sometimes referred to as a second slit) is adjacent to the side 918 of the frame 902. For example, the slit 1102 adjacent to the side 916 is configured to receive a tab (e.g., the tab 1012 of FIGS. 10A-10B) of the side panel 904 to facilitate the side panel 904 in securely coupling to the side 916. Further, the slit 1102 adjacent to the side 918 is configured to receive a tab (e.g., the tab 1012 of FIGS. 10A-10B) of the side panel 906 to facilitate the side panel 906 in securely coupling to the side 918.

As illustrated in FIGS. 11A-11B, a filter guide 1104 is coupled to the end panel 1100 via fasteners 1106. When coupled to the end panel 1100, the filter guide 1104 extends along the end panel 1100 to guide a filter (e.g., the filter 104, the filter 802, the filter 804) into and/or out of slot 924 of the filter rack 900 via an opening defined by the side 916 of the frame 902 and/or an opening defined by the side 918 of the frame 902. The filter guide 1104 also is configured to securely position the filter within the slot 924 of the filter rack 900.

In the illustrated example, the end panel 1100 defines a plurality of holes 1108 (sometimes referred to as apertures or openings) and slits 1110 adjacent to the holes 1108. The plurality of holes 1108 are configured to receive the fasteners 1106 to couple the filter guide 1104 to the end panel 1100. For example, the plurality of holes 1108 defined by the end panel 1100 includes a first row of holes 1112 adjacent to the side 916 of the filter rack 900 and a second row of holes 1114 adjacent to the side 918 of the filter rack 900. The first row of holes 1112 and the second row of holes 1114 are parallel to each other. Further, in the illustrated example, each of the first row of holes 1112 is aligned with a respective one of the second row of holes 1114 in a manner that is parallel to a longitudinal plane of the end panel 1100. Further, as illustrated in FIGS. 11A-11B, one of the slits 1110 is adjacent and parallel to the first row of holes 1112 and the other of the slits 1110 is adjacent and parallel to the second row of holes 1114.

As illustrated in FIG. 11A, the filter guide 1104 defines an opening 1116 (e.g., a hole, a slot) at each of its ends 1118. Further, in the illustrated example, each of the ends 1118 includes a z-shaped bracket that is configured to be inserted through a corresponding one of the slits 1110. For example, to couple the filter guide 1104 to the end panel 1100, one of the ends 1118 of the filter guide 1104 is inserted through the slit 1110 adjacent to the first row of holes 1112 and the other of the ends 1118 of the filter guide 1104 is inserted through the slit 1110 adjacent to the second row of holes 1114.

Further, the opening 1116 of one of the ends 1118 of the filter guide 1104 is aligned with one of the first row of holes 1112 and the opening 1116 of the other of the ends 1118 of the filter guide 1104 is aligned with a corresponding one of the second row of holes 1114. For example, when the filter guide 1104 is positioned in such a manner, the filter guide 1104 is parallel to the longitudinal plane of end panel 1100. Further, one of the fasteners 1106 is inserted through (i) the one of the first row of holes 1112 and (ii) the one of the openings 1116 of the filter guide 1104 that are aligned to couple the corresponding end 1118 of the filter guide 1104 to the end panel 1100. Another one of the fasteners 1106 is inserted through (i) the one of the second row of holes 1114 and (ii) the one of the openings 1116 of the filter guide 1104 that are aligned to couple the corresponding end 1118 of the filter guide 1104 to the end panel 1100. For example, one or more of the fasteners 1106 includes a screw and a nut that threadably mate to couple the filter guide 1104 to the end panel 1100.

In the illustrated example, the plurality of holes 1108 enable a position of the filter guide 1104 to be adjustable to enable filters of different sizes (e.g., about a 1-inch thickness, a 2-inch thickness, a 4-inch thickness, etc.) to be inserted into and securely housed within the slot 924. Additionally or alternatively, the filter guide 1104 is asymmetrically shaped such that the filter guide 1104 is configured to guide and secure one filter in a first orientation and another differently-sized filter in a second orientation. For example, the filter guide 1104 is configured to receive and secure (i) a first filter size when the filter guide 1104 is in a first orientation and coupled to the end panel 1100 via a first of the first row of holes 1112 and the second row of holes 1114, (ii) a second filter size when the filter guide 1104 is in a second orientation and coupled to the end panel 1100 via the first of the first row of holes 1112 and the second row of holes 1114, (iii) a third filter size when the filter guide 1104 is in the first orientation and coupled to the end panel 1100 via a second of the first row of holes 1112 and the second row of holes 1114, and (iv) a fourth filter size when the filter guide 1104 is in the second orientation and coupled to the end panel 1100 via the second of the first row of holes 1112 and the second row of holes 1114.

Figure 12A:
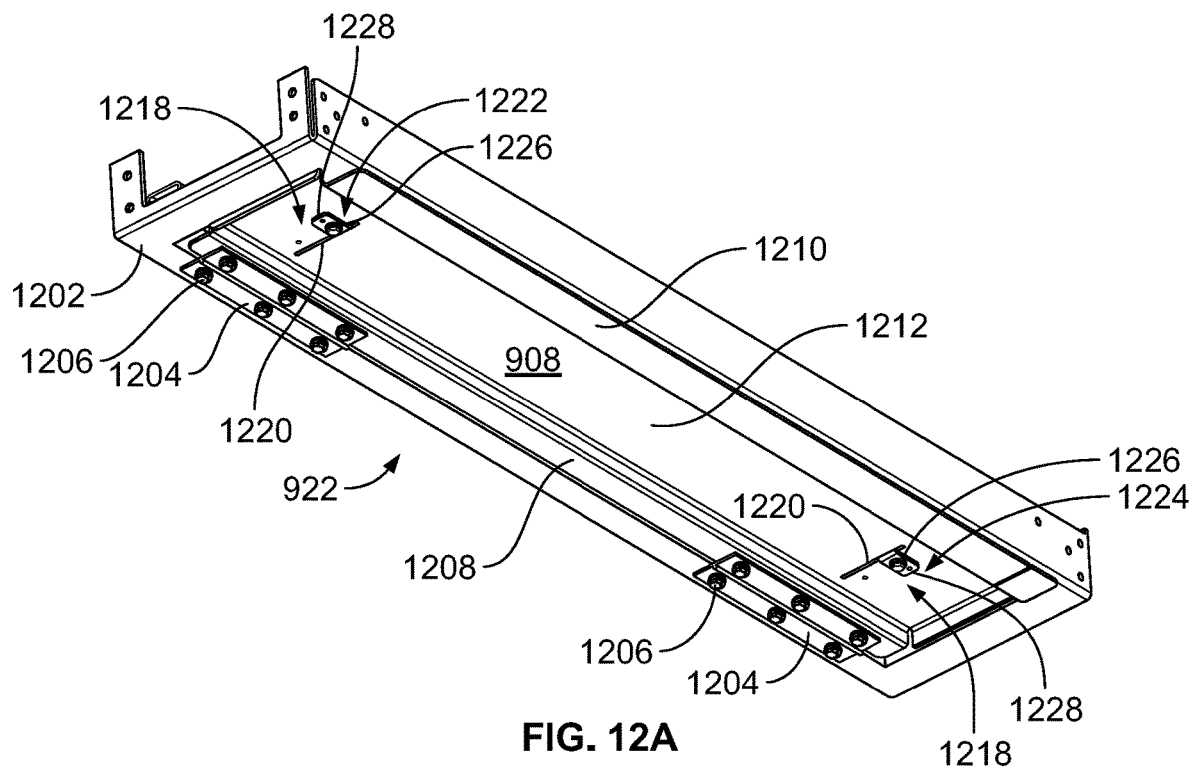
FIGS. 12A-12B depict an end panel, a rotatable panel, and a filter guide of the filter rack of FIG. 9.
Figure 12B:
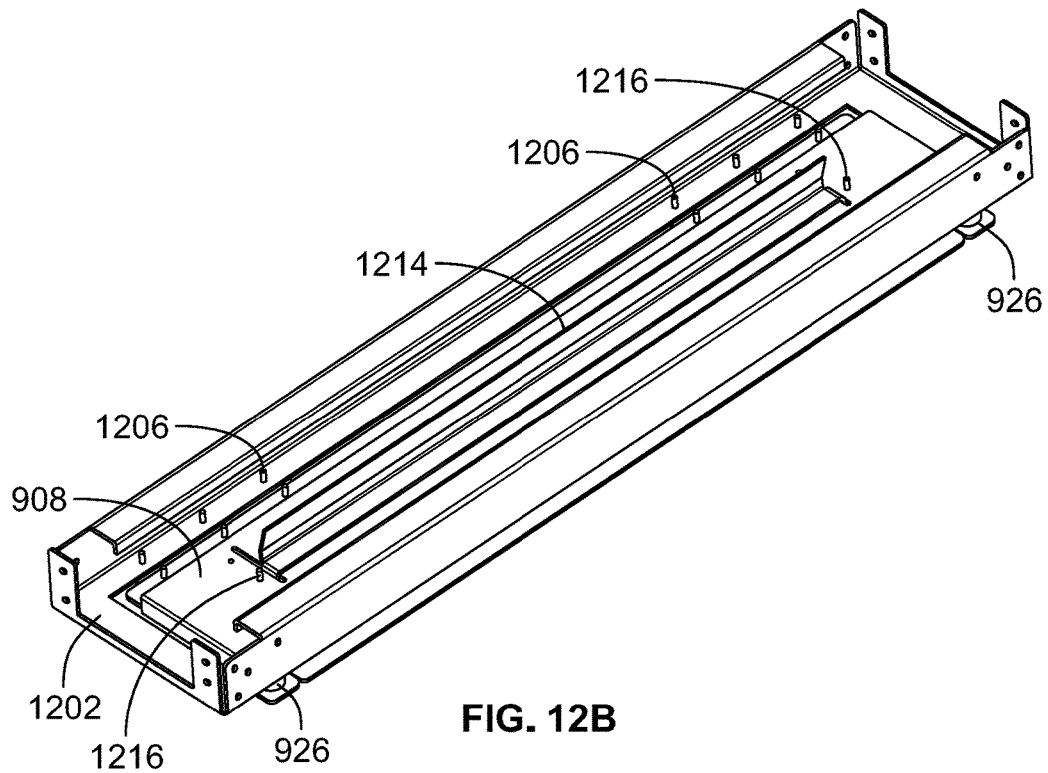

FIGS. 12A-12B depict the end 922 of the filter rack 900. As illustrated in FIGS. 12A-12B, the rotatable panel 908 of the filter rack 900 is rotatably coupled to an end panel 1202 of the frame 902, via one or more hinges 1204, along an edge (e.g., a rear edge) of the end 922 of the frame 902. In the illustrated example, fasteners 1206 couple the hinges 1204 to the end panel 1202 and/or the rotatable panel 908 to the hinges 1204. For example, one or more of the fasteners 1206 include a screw and a nut that threadably mate to couple the hinges 1204 to the end panel 1202 and/or the rotatable panel 908 to the hinges 1204.

The rotatable panel 908 of the illustrated example includes a first side 1208, a second side 1210 opposite the first side 1208, and a middle portion 1212 between the first side 1208 and the second side 1210. The first side 1208 is coupled to the hinges 1204 via some of the fasteners 1206 such that the first side 1208 is hingedly coupled to the end panel 1202. Further, the second side 1210 of the rotatable panel 908 is configured to magnetically couple to one or more of the magnets 926 located along an edge (e.g., a front edge) of the end 922 when the rotatable panel 908 is in the closed position. Additionally, when the rotatable panel 908 is closed, the middle portion 1212 is configured to cover an opening for the slot 924 defined at the end 922

In the illustrated example, the first side 1208 of the rotatable panel 908 includes a flange (sometimes referred to as a first flange), the second side 1210 includes another flange (sometimes referred to as a second flange), and the middle portion 1212 includes a recessed portion that extending between the opposing flanges. The flange of the second side 1210 is configured to extend beyond a front edge of the frame 902 when the rotatable panel 908 is in the closed position. For example, the flange of the second side 1210 of the rotatable panel 908 extends beyond the frame 106 to facilitate a technician in grasping the rotatable panel 908 while transitioning the rotatable panel 908 between the closed position and the open position.

As illustrated in FIGS. 12A-12B, a filter guide 1214 is coupled to the rotatable panel 908 via fasteners 1216. When coupled to the rotatable panel 908, the filter guide 1214 extends along the rotatable panel 908 to guide a filter (e.g., the filter 104, the filter 802, the filter 804) into and/or out of slot 924 of the filter rack 900 via an opening defined by the side 916 of the frame 902 and/or an opening defined by the side 918 of the frame 902. The filter guide 1214 also is configured to securely position the filter within the slot 924 of the filter rack 900.

In the illustrated example, the rotatable panel 908 defines a plurality of holes 1218 (sometimes referred to as apertures or openings) and slits 1220 adjacent to the holes 1218. The plurality of holes 1218 are configured to receive the fasteners 1216 to couple the filter guide 1214 to the rotatable panel 908. For example, the plurality of holes 1218 defined by the rotatable panel 908 includes a first row of holes 1222 adjacent to the side 916 of the filter rack 900 and a second row of holes 1224 adjacent to the side 918 of the filter rack 900. The first row of holes 1222 and the second row of holes 1224 are parallel to each other. Further, in the illustrated example, each of the first row of holes 1222 is aligned with a respective one of the second row of holes 1224 in a manner that is parallel to a longitudinal plane of the rotatable panel 908. Further, as illustrated in FIGS. 12A-12B, one of the slits 1220 is adjacent and parallel to the first row of holes 1222 and the other of the slits 1220 is adjacent and parallel to the second row of holes 1224.

As illustrated in FIG. 12A, the filter guide 1214 defines an opening 1226 (e.g., a hole, a slot) at each of its ends 1228. Further, in the illustrated example, each of the ends 1228 includes a z-shaped bracket that is configured to be inserted through a corresponding one of the slits 1220. For example, to couple the filter guide 1214 to the rotatable panel 908, one of the ends 1228 of the filter guide 1214 is inserted through the slit 1220 adjacent to the first row of holes 1222 and the other of the ends 1228 of the filter guide 1214 is inserted through the slit 1220 adjacent to the second row of holes 1224.

Further, the opening 1226 of one of the ends 1228 of the filter guide 1214 is aligned with one of the first row of holes 1222 and the opening 1226 of the other of the ends 1228 of the filter guide 1214 is aligned with a corresponding one of the second row of holes 1224. For example, when the filter guide 1214 is positioned in such a manner, the filter guide 1214 is parallel to the longitudinal plane of rotatable panel 908. Further, one of the fasteners 1216 is inserted through (i) the one of the first row of holes 1222 and (ii) the one of the openings 1226 of the filter guide 1214 that are aligned to couple the corresponding end 1228 of the filter guide 1214 to the rotatable panel 908. Another one of the fasteners 1216 is inserted through (i) the one of the second row of holes 1224 and (ii) the one of the openings 1226 of the filter guide 1214 that are aligned to couple the corresponding end 1228 of the filter guide 1214 to the rotatable panel 908. For example, one or more of the fasteners 1216 includes a screw and a nut that threadably mate to couple the filter guide 1214 to the rotatable panel 908.

In the illustrated example, the plurality of holes 1218 enable a position of the filter guide 1214 to be adjustable to enable filters of different sizes (e.g., about a 1-inch thickness, a 2-inch thickness, a 4-inch thickness, etc.) to be inserted into and securely housed within the slot 924. Additionally or alternatively, the filter guide 1214 is asymmetrically shaped such that the filter guide 1214 is configured to guide and secure one filter in a first orientation and another differently-sized filter in a second orientation. For example, the filter guide 1214 is configured to receive and secure (i) a first filter size when the filter guide 1214 is in a first orientation and coupled to the rotatable panel 908 via a first of the first row of holes 1222 and the second row of holes 1224, (ii) a second filter size when the filter guide 1214 is in a second orientation and coupled to the rotatable panel 908 via the first of the first row of holes 1222 and the second row of holes 1224, (iii) a third filter size when the filter guide 1214 is in the first orientation and coupled to the rotatable panel 908 via a second of the first row of holes 1222 and the second row of holes 1224, and (iv) a fourth filter size when the filter guide 1214 is in the second orientation and coupled to the rotatable panel 908 via the second of the first row of holes 1222 and the second row of holes 1224.

Figure 13:
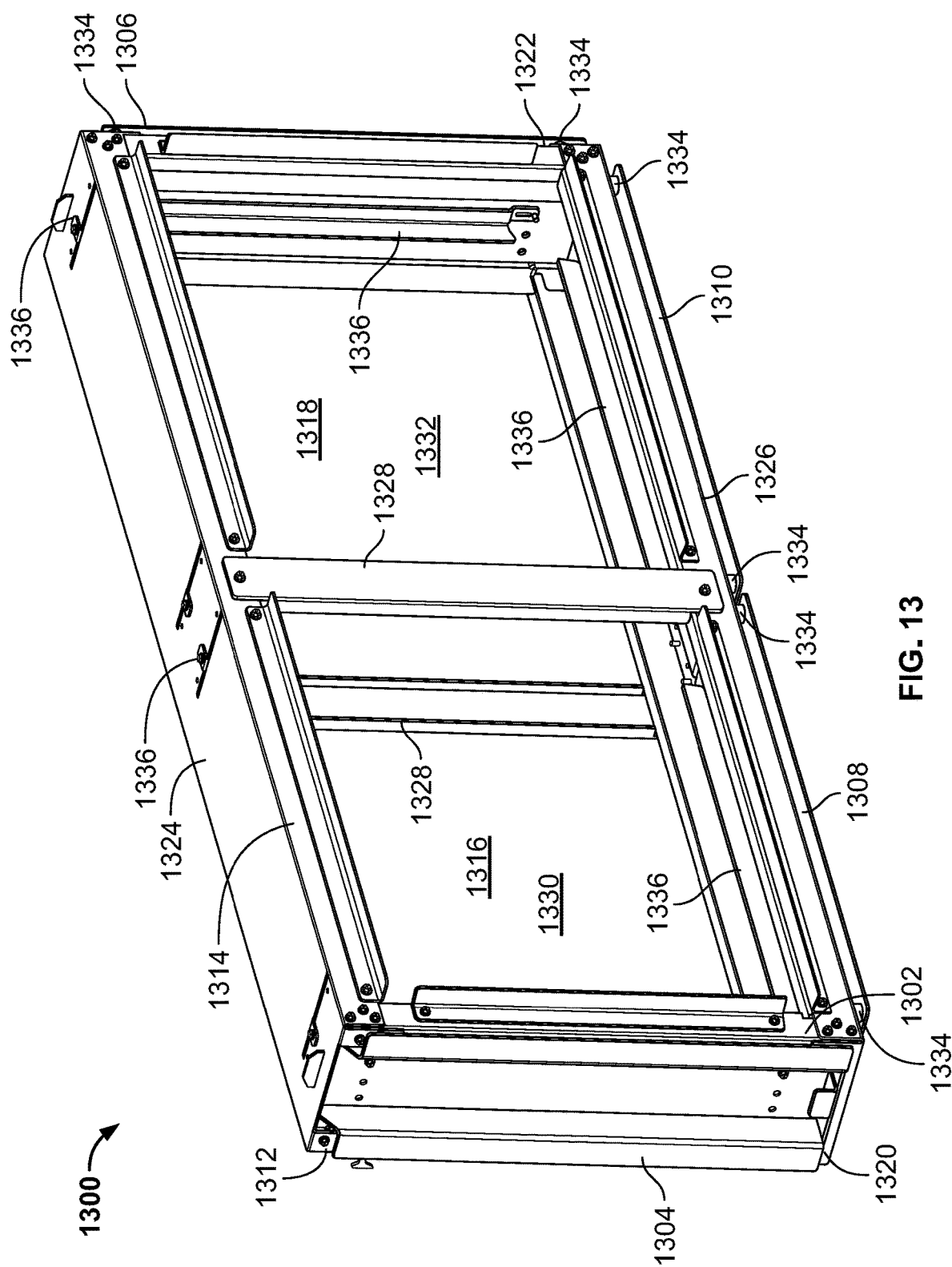
FIG. 13 illustrates another example filter rack for a blower coil unit in accordance with the teachings herein.

FIG. 13 illustrate another example filter rack 1300 for housing filters for a blower coil unit (e.g., the blower coil unit 102) in accordance with the teachings herein. The filter rack 1300 of the illustrated example is configured to house one or more filters (e.g., the filter 104, the filter 802, the filter 804) for the blower coil unit. The filter rack 1300 includes a frame 1302, a side panel 1304 (sometimes referred to as a first side panel), a side panel 1306 (sometimes referred to as a second side panel), a rotatable panel 1308 (sometimes referred to as a first rotatable panel), and a rotatable panel 1310 (sometimes referred to as a second rotatable panel).

Each of the side panel 1304 and the side panel 1306 of the filter rack 1300 is identical and/or substantially similar to the side panel 1000 of FIGS. 10A-10B. Further, each of the rotatable panel 1308 and the rotatable panel 1310 is identical and/or substantially similar to the rotatable panel 908 of of FIGS. 9 and 12A-12B. Because the side panel 1000 and the rotatable panel 908 have been disclosed in detail with respect to FIGS. 9, 10A-10B, and 12A-12B, some features of the side panel 1304, the side panel 1306, the rotatable panel 1308, and the rotatable panel 1310 will not be discussed in further detail below.

As illustrated in FIG. 13, the frame 1302 includes a rear frame structure 1312 and a front frame structure 1314 that are spaced apart from and coupled to each other. In the illustrated example, the frame 1302 defines an air passageway 1316 (sometimes referred to as a first air passageway) and another air passageway 1318 (sometimes referred to as a second air passageway) that are arranged in a side-by-side manner. Further, the frame 1302 includes a side 1320 (sometimes referred to as a first side), a side 1322 (sometimes referred to as a second side) opposite the side 1320, an end 1324 (sometimes referred to as a first end or side), and an end 1326 (sometimes referred to as a first end or side) opposite the end 1324. For example, each of the side 1320, the side 1322, the end 1324, and the end 1326 extend between the rear frame structure 1312 and the front frame structure 1314. Additionally, the side 1320 and the side 1322 extend between the end 1324 and the end 1326, and the end 1324 and the end 1326 extend between the side 1320 and the side 1320. In the illustrated example, the frame 1302 also includes a mullion 1328. The mullion 1328 (1) is coupled to and extends between the end 1324 and the end 1326 and (2) is positioned between the side 1322 and the side 1324 of the frame 1302 to define the air passageway 1316 and the air passageway 1318 in the side-by-side manner.

The frame 1302 of the illustrated example defines a slot 1330 (sometimes referred to as a first slot) in which a filter is to be positioned for the air passageway 1316. Further, the frame 1302 defines another slot 1332 (sometimes referred to as a second slot) in which a filter is to be positioned for the air passageway 1318. As illustrated in FIG. 13, the slot 1330 and the slot 1332 are arranged in a side-by-side manner. For example, the side 1320, the end 1324, the end 1326, and the mullion 1328 define the slot 1330. Further, the 1322, the end 1324, the end 1326, and the mullion 1328 define the slot 1332. When a filter (e.g., the filter 104, the filter 802, the filter 804) is housed within the slot 1330, the filter is positioned within a portion of the air passageway 1316 to filter air that is blown from and/or to a blower coil unit. Further, when a filter is housed within the slot 1332, the filter is positioned within a portion of the air passageway 1318 to filter air that is blown from and/or to the blower coil unit.

In the illustrated example, the side 1320 is substantially similar and/or identical to the side 916 of the filter rack 900 of FIG. 9. For example, the side 1320 defines an opening (sometimes referred to as a side opening) to the slot 1330 that is substantially similar and/or identical to that of the slot 924. Further, the side 1322 is substantially similar and/or identical to the side 918 of the filter rack 900 of FIG. 9. For example, the side 1320 defines an opening (sometimes referred to as a side opening) to the slot 1332 that is substantially similar and/or identical to that of the slot 924. Additionally, the end 1326 is similar to the end 922 of the filter rack 900 of FIG. 9. For example, the end 1326 defines an opening (sometimes referred to as a side or end opening) to the slot 1330 that is substantially similar and/or identical to that of the slot 924 and defines an opening (sometimes referred to as a side or end opening) to the slot 1332 that is substantially similar and/or identical to that of the slot 924. The openings of the frame 1302 enable a technician to remove a filter from, insert a filter into, and/or otherwise access a filter within the slot 1330 and/or the slot 1332. Because the side 916, the side 918, and the end 922 have been disclosed in detail with respect to FIG. 9, some features of the side 1320, the side 1322, and the end 1326 of the frame 1302 will not be discussed in further detail below.

The end 1324 of the illustrated example also is similar to the end 920 of the frame 902 of FIG. 9. For example, the end 1324 defines slits for the side panel 1304 and the side panel 1306, respectively, that are each substantially similar and/or identical to the slits 1102 of the end panel 1100 of FIGS. 11A-11B. Further, the end 1324 defines a plurality of holes and slits for filter guides of the slot 1330 and the slot 1332, respectively, that are each substantially similar and/or identical to the plurality of holes 1108 and the slits 1110 of the end panel 1100 of FIG. 11. Because the end panel 1100 has been disclosed in detail with respect to FIGS. 9 and 11A-1B, some features of the end 1324 will not be discussed in further detail below.

As illustrated in FIG. 13, the filter rack 1300 of the illustrated example includes magnets 1334 that are fixed to the side 1320, the side 1322, and the end 1326. The magnets 1334 are substantially similar and/or identical to the magnets 926 of the filter rack 900 of FIG. 9. Because the magnets 926 have been disclosed in detail with respect to FIG. 9, some features of the magnets 1334 will not be discussed in further detail below. The filter rack 1300 of the illustrated example also includes filter guides 1336 (sometimes referred to as stoppers) that are configured to guide a filter into and/or securely house a filter within the filter rack 1300. The filter guides 1336 of the filter rack 1300 are substantially similar and/or identical to the filter guide 1016, the filter guide 1104, and/or the filter guide 1214 of FIGS. 10A-12B. Because the filter guide 1016, the filter guide 1104, and the filter guide 1214 have been disclosed in detail with respect to FIGS. 10A-12B, some features of the filter guides 1336 will not be discussed in further detail below. Further, in the illustrated example, one of the filter guides 1336 is coupled to the mullion 1328 for the slot 1330, and another of the filter guides 1336 is coupled to the mullion 1328 for the slot 1332.

In the illustrated example, the side panel 1304 and the rotatable panel 1308 securely enclose a filter positioned within the slot 1330 when the side panel 1304 is coupled to the side 1320 via one or more of the magnets 1334 and the rotatable panel 1308 is coupled to the end 1326 via one or more of the magnets 1334. For example, the side 1320 defines an opening to the slot 1330 that the side panel 1304 is configured to cover, and the end 1326 defines another opening to the slot 1330 that the rotatable panel 1308 is configured to cover in the closed position. Further, the side panel 1304 provides access to the slot 1330 when decoupled from the side 1320 and/or the rotatable panel 1308 provides access to the slot 1330 when decoupled from the corresponding one or more of the magnets 1334 positioned along the end 1326.

Similarly, the side panel 1306 and the rotatable panel 1310 securely enclose a filter positioned within the slot 1332 when the side panel 1306 is coupled to the side 1322 via one or more of the magnets 1334 and the rotatable panel 1310 is coupled to the end 1326 via one or more of the magnets 1334. For example, the side 1322 defines an opening to the slot 1332 that the side panel 1306 is configured to cover, and the end 1326 defines another opening to the slot 1332 that the rotatable panel 1310 is configured to cover in the closed position. Further, the side panel 1306 provides access to the slot 1330 when decoupled from the side 1322 and/or the rotatable panel 1310 provides access to the slot 1332 when decoupled from the corresponding one or more of the magnets 1334 positioned along the end 1326.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A filter rack for a blower coil unit, the filter rack comprising:
    a frame including:
        a rear frame structure configured to couple to the blower coil unit;
        a front frame structure coupled to and spaced apart from the rear frame structure to define a slot that is configured to house a filter for filtering air flowing from the blower coil unit;
        a first side extending between the front frame structure and the rear frame structure, the first side defines a first opening to the slot to enable the filter to be inserted into and removed from the slot; and
        a second side of the frame that extends between the front frame structure and the rear frame structure opposite the first side, the second side defines a second opening to the slot to further enable the filter to be inserted into and removed from the slot;
    a first magnet fixed along the first side;
    a second magnet fixed along the second side;
    a first side panel configured to couple to the first side via the first magnet, the first side panel securely encloses the filter within the slot when coupled to the first side and provides access to the slot when decoupled from the first side; and
    a second side panel configured to couple to the second side via the second magnet, the second side panel securely encloses the filter within the slot when coupled to the second side and provides access to the slot via the second opening when decoupled from the second side.

2. The filter rack of claim 1, wherein the first side panel includes:
    a first flange configured to couple to the first side along a front edge;
    a second flange configured to couple to the first side along a rear edge; and
    a recessed portion between the first flange and the second flange that is configured to extend into the first opening when the first side panel is coupled to the first side.

3. The filter rack of claim 1, wherein the frame includes an end panel extending between the front frame structure and the rear frame structure, wherein the end panel defines a slit adjacent to the first side.

4. The filter rack of claim 3, wherein the first side panel includes:
    a first edge;
    a second edge opposite the first edge;
    a tab extending from the first edge that is configured to be inserted into the slit to securely couple the first side panel to the first side; and a handle extending from the second edge that facilitates a user in grasping the first side panel while coupling or decoupling the first side panel to or from the first side.

5. The filter rack of claim 1, further including a plurality of magnets that includes the first magnet and is positioned along edges of the first side.

6. The filter rack of claim 1, further including filter guides extending between the first side and the second side to guide the filter as the filter is being inserted into or removed from the slot via the first opening.

7. The filter rack of claim 6, wherein the filter guides are adjustable to enable filters of different sizes to be securely housed within the slot.

8. The filter rack of claim 7, further including end panels that extend between the front frame structure and the rear frame structure and between the first side and the second side, each of the end panels defines slits extending between the first side and the second side, each of the filter guides is inserted into one of the slits to adjustably position the filter guides.

9. The filter rack of claim 1, wherein the frame includes an end that extends between the front frame structure and the rear frame structure, the end defines a third opening to the slot that enables the filter to be inserted into and removed from the slot.

10. The filter rack of claim 9, further including:
a third magnet fixed along the end of the frame; and
a rotatable panel that is hingedly coupled to the end and configured to couple to the third magnet, wherein the rotatable panel is coupled to the third magnet in a closed position to securely enclose the filter within the slot, wherein the rotatable panel is decoupled from the third magnet in an open position to provide access to the slot via the third opening.

11. The filter rack of claim 9, further including a filter guide coupled to the first side to guide the filter as the filter is inserted into or removed from the slot via the third opening.

12. A filter rack for a blower coil unit, the filter rack comprising:
a frame including:
a rear frame structure configured to couple to the blower coil unit;
a front frame structure coupled to and spaced apart from the rear frame structure to define a slot that is configured to house a filter for filtering air flowing from the blower coil unit;
an end extending between the front frame structure and the rear frame structure, the end defines a first opening to the slot to enable the filter to be inserted into and removed from the slot; and
a first side of the frame that extends between the front frame structure and the rear frame structure, the first side defines a first side opening to the slot to further enable the filter to be inserted into and removed from the slot;
a first magnet fixed along the end;
a first side magnet fixed along the first side;
a rotatable panel hingedly coupled to the end and configured to couple to the first magnet, wherein the rotatable panel is coupled to the first magnet in a closed position to securely enclose the filter within the slot, wherein the rotatable panel is decoupled from the first magnet in an open position to provide access to the slot; and
a first side panel configured to couple to the first side via the first side magnet, the first side panel securely encloses the filter within the slot when coupled to the first side and provides access to the slot via the first side opening when decoupled from the first side.

13. The filter rack of claim 12, wherein the rear frame structure is configured to couple to the blower coil unit such that the end is a top end and the rotatable panel rotates upwardly to the open position.

14. The filter rack of claim 13, wherein the rear frame structure is configured to couple to the blower coil unit such that the end is a bottom end and the rotatable panel rotates downwardly to the open position.

15. The filter rack of claim 12, further including a hinge that hingedly couples the rotatable panel to the end.

16. The filter rack of claim 12, wherein the rotatable panel includes:
a first side hingedly coupled to the end;
a second side configured to couple to the first magnet; and
a middle portion extending between the first side and the second side that is configured to cover the first opening when the rotatable panel is in the closed position.

17. The filter rack of claim 16, wherein the second side includes a flange that is configured to extend beyond the frame when the rotatable panel is in the closed position to facilitate a user in grasping the rotatable panel while transitioning the rotatable panel between the closed position and the open position.

18. The filter rack of claim 12, further including a plurality of magnets that includes the first magnet and is positioned along an edge of the end.

19. The filter rack of claim 12, further including:
opposing side panels including the first side panel coupled to the frame; and
filter guides extending along the side panels that guide the filter as the filter is inserted into or removed from the slot via the first opening.

20. The filter rack of claim 12, further including:
a second side of the frame that extends between the front frame structure and the rear frame structure opposite the first side, the second side defines a second side opening to the slot to further enable the filter to be inserted into and removed from the slot;
a second side magnet fixed along the second side; and
a second side panel configured to couple to the second side via the second side magnet, the second side panel securely encloses the filter within the slot when coupled to the second side and provides access to the slot via the second side opening when decoupled from the second side.

21. The filter rack of claim 20, further including a filter guide coupled to the rotatable panel to guide the filter as the filter is inserted into or removed from the slot via the first side opening or the second side opening.

22. A filter rack for a blower coil unit, the filter rack comprising:
a frame including:
a rear frame structure configured to couple to the blower coil unit;
a front frame structure coupled to and spaced apart from the rear frame structure;
a mullion coupled to the front frame structure and the rear frame structure, wherein the front frame structure and the rear frame structure define a first slot and a second slot that are separated from each by the mullion and are configured to house filters for filtering air flowing from the blower coil unit; and
sides defining openings to the first slot and the second slot to enable the filters to be inserted into and removed from the first slot and the second slot;

magnets fixed along the sides adjacent to the openings; and panels configured to couple to the sides via the magnets, the panels securely enclose the filters within the first slot and the second slot when coupled to the magnets and provide access to the first slot and the second slot when decoupled from the magnets.

23. The filter rack of claim 22, wherein the sides include a first side that defines a first side opening to the first slot and a second side that defines a second side opening to the second slot, wherein the panels include a first side panel that is configured to couple to the first side to cover the first opening and a second side panel that is configured to couple to the second side to cover the second opening.

24. The filter rack of claim 22, wherein one of the sides includes an end panel that defines a first opening to the first slot and a second opening to the second slot, wherein the panels include a first rotatable panel that is rotatably coupled to the end panel and configured to cover the first opening, wherein the panels include a second rotatable panel that is rotatably coupled to the end panel and configured to cover the second opening.

* * * * *